US010409612B2

(12) United States Patent
Dixon et al.

(10) Patent No.: US 10,409,612 B2
(45) Date of Patent: *Sep. 10, 2019

(54) APPARATUS AND METHOD FOR TRANSACTIONAL MEMORY AND LOCK ELISION INCLUDING AN ABORT INSTRUCTION TO ABORT SPECULATIVE EXECUTION

(71) Applicant: Intel Corporation, Santa Clara, CA (US)

(72) Inventors: Martin G. Dixon, Portland, OH (US); Ravi Rajwar, Portland, OR (US); Konrad K. Lai, Vancouver, WA (US); Robert S. Chappell, Portland, OR (US); Rajesh S. Parthasarathy, Hillsboro, OR (US); Alexandre J. Farcy, Hillsboro, OR (US); Ilhyun Kim, Beaverton, OR (US); Prakash Math, Portland, OR (US); Matthew Merten, Hillsboro, OR (US); Vijaykumar Kadgi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,249

(22) Filed: Dec. 26, 2015

(65) Prior Publication Data

US 2016/0246606 A1 Aug. 25, 2016

Related U.S. Application Data

(63) Continuation of application No. 13/997,248, filed as application No. PCT/US2012/023597 on Feb. 2, 2012, now abandoned.

(51) Int. Cl.
*G06F 9/30* (2018.01)
*G06F 9/38* (2018.01)
(Continued)

(52) U.S. Cl.
CPC .......... *G06F 9/3855* (2013.01); *G06F 9/3004* (2013.01); *G06F 9/3016* (2013.01);
(Continued)

(58) Field of Classification Search
CPC .... G06F 9/3004; G06F 9/30087; G06F 9/467; G06F 9/528
See application file for complete search history.

(56) References Cited

U.S. PATENT DOCUMENTS 6,470,478 B1 10/2002 Bargh et al.
7,620,793 B1 11/2009 Edmondson et al.
(Continued)

FOREIGN PATENT DOCUMENTS

WO 2013115816 A1 8/2013

OTHER PUBLICATIONS

Abandonment from U.S. Appl. No. 13/997,248, dated May 4, 2017, 3 pages.
(Continued)

*Primary Examiner* — Aimee Li
*Assistant Examiner* — Courtney P Carmichael-Moody
(74) *Attorney, Agent, or Firm* — Nicholson De Vos Webster & Elliott LLP

(57) ABSTRACT

An apparatus and method is described herein for providing robust speculative code section abort control mechanisms. Hardware is able to track speculative code region abort events, conditions, and/or scenarios, such as an explicit abort instruction, a data conflict, a speculative timer expiration, a disallowed instruction attribute or type, etc. And hardware, firmware, software, or a combination thereof
(Continued)

makes an abort determination based on the tracked abort events. As an example, hardware may make an initial abort determination based on one or more predefined events or choose to pass the event information up to a firmware or software handler to make such an abort determination. Upon determining an abort of a speculative code region is to be performed, hardware, firmware, software, or a combination thereof performs the abort, which may include following a fallback path specified by hardware or software. And to enable testing of such a fallback path, in one implementation, hardware provides software a mechanism to always abort speculative code regions.

20 Claims, 8 Drawing Sheets

(51) Int. Cl.
| | |
|---|---|
| G06F 12/0875 | (2016.01) |
| G06F 12/0897 | (2016.01) |
| G06F 13/16 | (2006.01) |
| G06F 13/40 | (2006.01) |
| G06F 12/084 | (2016.01) |
| G06F 12/0895 | (2016.01) |
| G06F 13/42 | (2006.01) |
| G06F 12/0831 | (2016.01) |
| G06F 9/52 | (2006.01) |
| G06F 12/0811 | (2016.01) |
| G06F 12/0862 | (2016.01) |
| G06F 12/1027 | (2016.01) |
| G06F 9/46 | (2006.01) |
| G06F 12/0815 | (2016.01) |
| G06F 12/1045 | (2016.01) |
| G06F 12/0806 | (2016.01) |

(52) U.S. Cl.
CPC ...... *G06F 9/30047* (2013.01); *G06F 9/30087* (2013.01); *G06F 9/30098* (2013.01); *G06F 9/30145* (2013.01); *G06F 9/3802* (2013.01); *G06F 9/384* (2013.01); *G06F 9/3842* (2013.01); *G06F 9/467* (2013.01); *G06F 9/528* (2013.01); *G06F 12/084* (2013.01); *G06F 12/0806* (2013.01); *G06F 12/0811* (2013.01); *G06F 12/0815* (2013.01); *G06F 12/0831* (2013.01); *G06F 12/0862* (2013.01); *G06F 12/0875* (2013.01); *G06F 12/0895* (2013.01); *G06F 12/0897* (2013.01); *G06F 12/1027* (2013.01); *G06F 12/1045* (2013.01); *G06F 13/1673* (2013.01); *G06F 13/4068* (2013.01); *G06F 13/4282* (2013.01); *G06F 2212/452* (2013.01); *G06F 2212/50* (2013.01); *G06F 2212/60* (2013.01); *G06F 2212/602* (2013.01); *G06F 2212/621* (2013.01); *G06F 2212/68* (2013.01); *G06F 2212/682* (2013.01)

(56) References Cited

U.S. PATENT DOCUMENTS

| | | |
|---|---|---|
| 2006/0161740 A1 | 7/2006 | Kottapalli et al. |
| 2007/0136289 A1 | 6/2007 | Adl-Tabatabai et al. |
| 2007/0186215 A1 | 8/2007 | Rajwar et al. |
| 2007/0260942 A1* | 11/2007 | Rajwar .................. G06F 9/526 714/54 |
| 2008/0059676 A1 | 3/2008 | Archer et al. |
| 2008/0115042 A1 | 5/2008 | Akkary et al. |
| 2008/0126883 A1 | 5/2008 | Caprioli et al. |
| 2009/0119459 A1* | 5/2009 | Akkary .................. G06F 9/526 711/130 |
| 2010/0023703 A1 | 1/2010 | Christie et al. |
| 2010/0023704 A1 | 1/2010 | Christie et al. |
| 2010/0162247 A1 | 6/2010 | Welc et al. |
| 2010/0169579 A1 | 7/2010 | Sheaffer et al. |
| 2010/0287340 A1 | 11/2010 | Rajwar et al. |
| 2011/0093750 A1* | 4/2011 | Williams .............. G06F 9/5077 714/47.2 |
| 2011/0145512 A1 | 6/2011 | Adl-Tabatabai et al. |
| 2011/0209155 A1 | 8/2011 | Giampapa et al. |
| 2012/0159084 A1 | 6/2012 | Pohlack et al. |

OTHER PUBLICATIONS

Advisory Action from U.S. Appl. No. 14/998,207, dated Jun. 8, 2017, 3 pages.
Final Office Action from U.S. Appl. No. 14/998,276, dated Jun. 28, 2017, 41 pages.
International Preliminary Report on Patentability for Application No. PCT/US2012/023597, dated Aug. 14, 2014, 10 pages.
International Search Report and Written Opinion for Application No. PCT/US2012/023597, dated Oct. 25, 2012, 11 pages.
Non-final Office Action from U.S. Appl. No. 13/997,248, dated Aug. 25, 2016, 42 pages.
Non-Final Office Action from U.S. Appl. No. 14/757,857, dated Jun. 28, 2017, 33 pages.
Advisory Action from U.S. Appl. No. 14/757,857, dated Feb. 15, 2017, 2 pages.
Final Office Action from U.S. Appl. No. 14/757,857 dated Jan. 6, 2017, 27 pages.
Final Office Action from U.S. Appl. No. 14/998,207, dated Mar. 24, 2017, 19 pages.
Final Office Action from U.S. Appl. No. 14/998,250, dated Jan. 12, 2017, 23 pages.
Final Office Action from U.S. Appl. No. 14/998,272, dated Jan. 20, 2017, 26 pages.
Final Office Action from U.S. Appl. No. 14/998,296, dated May 12, 2017, 18 pages.
Non-Final Office Action from U.S. Appl. No. 14/998,118, dated Feb. 9, 2017, 18 pages.
Non-Final Office Action from U.S. Appl. No. 14/998,207, dated Dec. 1, 2016, 17 pages.
Non-Final Office Action from U.S. Appl. No. 14/998,248, dated Apr. 20, 2017, 22 pages.
Non-Final Office Action from U.S. Appl. No. 14/998,250, dated Jul. 29, 2016, 19 pages.
Non-Final Office Action from U.S. Appl. No. 14/998,272, dated Jul. 28, 2016, 21 pages.
Non-Final Office Action from U.S. Appl. No. 14/998,276, dated Feb. 23, 2017, 21 pages.
Non-Final Office Action from U.S. Appl. No. 14/998,296, dated Dec. 30, 2016, 21 pages.
Non-Final Office Action dated Jul. 12, 2016 for U.S. Appl. No. 14/757,857, filed Dec. 26, 2015, 21 pages.
Advisory Action from U.S. Appl. No. 14/998,118, dated Sep. 18, 2017, 3 pages.
Advisory Action from U.S. Appl. No. 14/998,276, dated Aug. 8, 2017, 3 pages.
Final Office Action from U.S. Appl. No. 13/997,248, dated Feb. 12, 2018, 51 pages.
Final Office Action from U.S. Appl. No. 14/757,857, dated Oct. 18, 2017, 33 pages.
Final Office Action from U.S. Appl. No. 14/998,118, dated Jul. 14, 2017, 39 pages.
Final Office Action from U.S. Appl. No. 14/998,248, dated Oct. 19, 2017, 67 pages.
Final Office Action from U.S. Appl. No. 14/998,250, dated Nov. 16, 2017, 53 pages.
Final Office action from U.S. Appl. No. 14/998,272, dated Dec. 18, 2017, 30 pages.
Non-Final Office Action from U.S. Appl. No. 14/998,118, dated Feb. 7, 2018, 22 pages.

(56) References Cited

OTHER PUBLICATIONS

Non-Final Office Action from U.S. Appl. No. 14/998,207, dated Nov. 16, 2017, 34 pages.
Non-Final Office Action from U.S. Appl. No. 14/998,250, dated Jul. 13 2017, 53 pages.
Non-Final Office Action from U.S. Appl. No. 14/998,272, dated Aug. 7, 2017, 72 pages.
Non-Final Office Action from U.S. Appl. No. 14/998,276, dated Jan. 8, 2018, 28 pages.
Non-Final Office Action from U.S. Appl. No. 14/998,296, dated Dec. 29, 2017, 33 pages.
Abandonment from U.S. Appl. No. 14/998,296, dated Sep. 13, 2018, 2 pages.
Abandonment from U.S. Appl. No. 14/998,276, dated Oct. 2, 2018, 02 pages.
Non-Final Office Action from U.S. Appl. No. 14/757,857, dated Sep. 20, 2018, 51 pages.
Non-Final Office Action from U.S. Appl. No. 14/998,248, dated Sep. 7, 2018, 32 pages.
Abandonment from U.S. Appl. No. 14/998,272, dated Jan. 11, 2019, 2 pages.
Abandonment from U.S. Appl. No. 13/997,248, dated Oct. 18, 2018, 02 pages.
Abandonment from U.S. Appl. No. 14/998,118, dated Oct. 17, 2018, 02 pages.
Abandonment from U.S. Appl. No. 14/998,207, dated Jul. 24, 2018, 3 pages.
Abandonment from U.S. Appl. No. 14/998,250, dated Jul. 24, 2018, 3 pages.

* cited by examiner

APPARATUS AND METHOD FOR TRANSACTIONAL MEMORY AND LOCK ELISION INCLUDING AN ABORT INSTRUCTION TO ABORT SPECULATIVE EXECUTION

CROSS-REFERENCE TO RELATED APPLICATION

This is a continuation application of U.S. patent application Ser. No. 13/997,248, filed Jun. 22, 2013, which is a U.S. National Phase Application under 35 U.S.C. § 371 of International Application No. PCT/US2012/023597, filed Feb. 2, 2012.

FIELD

This disclosure pertains to the field of integrated circuits and, in particular, to speculative execution, transactional execution, and abort control thereof.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions atomically. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware. Another type of transactional execution includes a Hardware Transactional Memory (HTM) System, where hardware is included to support access tracking, conflict resolution, and other transactional tasks.

A technique similar to transactional memory includes hardware lock elision (HLE), where a locked critical section is executed tentatively without the locks. And if the execution is successful (i.e. no conflicts), then the result are made globally visible. In other words, the critical section is executed like a transaction with the lock instructions from the critical section being elided, instead of executing an atomically defined transaction. As a result, in the example above, instead of replacing the hash table execution with a transaction, the critical section defined by the lock instructions are executed tentatively. Multiple threads similarly execute within the hash table, and their accesses are monitored/tracked. If both threads access/alter the same entry, conflict resolution may be performed to ensure data validity. But if no conflicts are detected, the updates to the hash table are atomically committed.

As can be seen, transactional execution and lock elision have the potential to provide better performance among multiple threads. However, HLE and TM are relatively new fields of study with regards to microprocessors. And as a result, HLE and TM implementations in processors have not bee fully explored or detailed.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth, such as examples of specific types of specific processor configurations, specific hardware structures, specific architectural and micro architectural details, specific register configurations, specific lock instructions, specific types of hardware monitors/tracking, specific data buffering techniques, specific critical section execution techniques, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific cache coherency details, specific lock instruction and critical section identification techniques, specific compiler makeup and operation, specific transactional memory structures, specific/detailed instruction implementation and Instruction Set Architecture definition, and other specific operational details of processors haven't been described in detail in order to avoid unnecessarily obscuring the present invention.

Although the following embodiments are described with reference to a processor, other embodiments are applicable to other types of integrated circuits and logic devices. Similar techniques and teachings of embodiments described herein may be applied to other types of circuits or semiconductor devices that can benefit from higher throughput and performance. For example, the disclosed embodiments are not limited to computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications include a microcontroller, a digital signal processor (DSP), a system on a chip, network computers (NetPC), set-top boxes, network hubs, wide area network (WAN) switches, or any other system that can perform the functions and operations taught below.

The method and apparatus described herein are for supporting lock elision and transactional memory. Specifically, lock elision (LE) and transactional memory (TM) are discussed with regard to transactional execution with a microprocessor, such as processor 100. Yet, the apparatus' and methods described herein are not so limited, as they may be implemented in conjunction with alternative processor architectures, as well as any device including multiple processing elements. For example, LE and/or RTM may be implemented in other types of integrated circuits and logic devices. Or it may be utilized in small form-factor devices, handheld devices, SOCs, or embedded applications, as discussed above.

Figure 1:
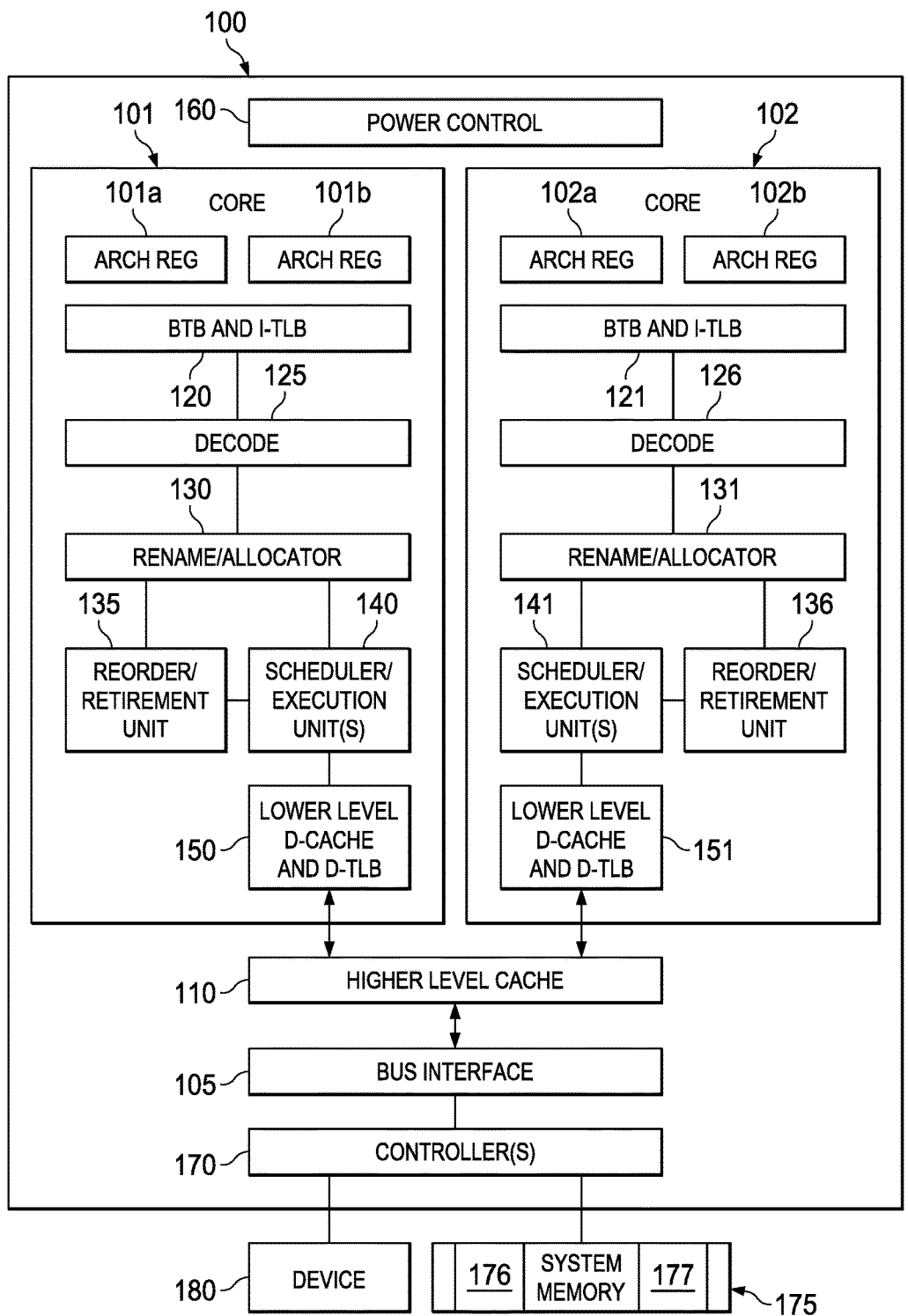
FIG. 1 illustrates an embodiment of a logical representation of a system including processor having multiple processing elements (2 cores and 4 thread slots).

Referring to FIG. 1, an embodiment of a processor including multiple cores is illustrated. Processor 100 includes any processor or processing device, such as a microprocessor, an embedded processor, a digital signal processor (DSP), a network processor, a handheld processor, an application processor, a co-processor, or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instructions or non-transactional instructions for execution within a critical section or transactional region. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. As illustrated in FIG. 1, the processor 100 includes power control 160 and core 102 includes its own BTB and I-TLB 121, decode unit 126, rename/allocator unit 131, scheduler/execution units 141, reorder/retirement unit 136 and low level D-Cache and D-TLB 151.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded instruction traces.

In the depicted configuration, processor 100 also includes bus interface module 105. Historically, controller 170, which is described in more detail below, has been included in a computing system external to processor 100. In this scenario, bus interface 105 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this exemplary configuration, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static RAM (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 170 is illustrated as part of processor 100. Recently, as more logic and devices are being integrated on a single die, such as System on a Chip (SOC), each of these devices may be incorporated on processor 100. For example in one embodiment, memory controller hub 170 is on the same package and/or die with processor 100. Here, a portion of the core (an on-core portion) includes one or more controller(s) 170 for interfacing with other devices such as memory 175 or a graphics device 180. The configuration including an interconnect and/or controllers for interfacing with such devices is often referred to as an on-core (or un-core configuration). As an example, bus interface 105 includes a ring interconnect with a memory controller for interfacing with memory 175 and a graphics controller for interfacing with graphics processor 180. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of hardware transactional execution, software transactional execution, or a combination/hybrid thereof. A transaction, which may also be referred to as execution of an atomic section/region of code, includes a grouping of instructions or operations to be executed as an atomic group. For example, instructions or operations may be used to demarcate or delimit a transaction or a critical section. In one embodiment, which is described in more detail below, these instructions are part of a set of instructions, such as an Instruction Set Architecture (ISA), which are recognizable by hardware of processor 100, such as decoder(s) 125 described above. Often, these instructions, once compiled from a high-level language to hardware recognizable assembly language include operation codes (opcodes), or other portions of the instructions, that decoder(s) 125 recognize during a decode stage. Transactional execution may be referred to herein as explicit (transactional memory via new instructions) or implicit (speculative lock elision via eliding of lock instructions, which is potentially based on hint versions of lock instructions).

Typically, during execution of a transaction, updates to memory are not made globally visible until the transaction is committed. As an example, a transactional write to a location is potentially visible to a local thread; yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible. However, if the transaction is invalidated during its pendency, the transaction is aborted and potentially restarted without making the updates globally visible. As a result, pendency of a transaction, as used herein, refers to a transaction that has begun execution and has not been committed or aborted (i.e. pending).

A Software Transactional Memory (STM) system often refers to performing access tracking, conflict resolution, or other transactional memory tasks within or at least primarily through execution of software or code. In one embodiment, processor 100 is capable of executing transactions utilizing hardware/logic, i.e. within a Hardware Transactional Memory (HTM) system, which is also referred to as a Restricted Transactional Memory (RTM) since it is restricted to the available hardware resources. Numerous specific implementation details exist both from an architectural and microarchitectural perspective when implementing an HTM; most of which are not discussed herein to avoid unnecessarily obscuring the discussion. However, some structures, resources, and implementations are disclosed for illustrative purposes. Yet, it should be noted that these structures and implementations are not required and may be augmented and/or replaced with other structures having different implementation details.

Another execution technique closely related to transactional memory includes lock elision {often referred to as speculative lock elision (SLE) or hardware lock elision (HLE)}. In this scenario, lock instruction pairs (lock and lock release) are augmented/replaced (either by a user, software, or hardware) to indicate atomic a start and an end of a critical section. And the critical section is executed in a similar manner to a transaction (i.e. tentative results are not made globally visible until the end of the critical section). Note that the discussion immediately below returns generally to transactional memory; however, the description may similarly apply to SLE, which is described in more detail later.

As a combination, processor 100 may be capable of executing transactions using a hybrid approach (both hardware and software), such as within an unbounded transactional memory (UTM) system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle larger size transactions, which are often referred to as unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software; this hybrid approach is commonly referred to as a hardware accelerated STM, since the primary transactional memory system (bookkeeping, etc) resides in software but is accelerated using hardware hooks.

Returning the discussion to FIG. 1, in one embodiment, processor 100 includes monitors to detect or track accesses, and potential subsequent conflicts, associated with data items; these may be utilized in hardware transactional execution, lock elision, acceleration of a software transactional memory system, or a combination thereof. A data item, data object, or data element, such as data item 201, may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses to data items may be performed at any of data level granularity. For example in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A (i.e. A::x and A::y) point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

Note these monitors, in one embodiment, are the same attributes (or included with) the attributes described above. Monitors may be utilized purely for tracking and conflict detection purposes. Or in another scenario, monitors double as hardware tracking and software acceleration support. Hardware of processor 100, in one embodiment, includes read monitors and write monitors to track loads and stores, which are determined to be monitored, accordingly (i.e. track tentative accesses from a transaction region or critical section). Hardware read monitors and write monitors may monitor data items at a granularity of the data items despite the granularity of underlying storage structures. Or alternatively, they monitor at the storage structure granularity. In one embodiment, a data item is bounded by tracking mechanisms associated at the granularity of the storage structures to ensure the at least the entire data item is monitored appropriately. As an illustrative example, if a data object spans 1.5 cache lines, the monitors for each of the two cache lines are set to ensure that the entire data object is appropriately tracked even though the second cache line is not full with tentative data.

In one embodiment, read and write monitors include attributes associated with cache locations, such as locations within lower level data cache 150, to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared, read monitored state and an external snoop indicating a write request to the data item. Inversely, a cache line holding a data item being in a buffered write state and an external snoop indicating a read request to the data item may be considered potentially conflicting. In one embodiment, to detect such combinations of access requests and attribute states, snoop logic is coupled to conflict detection/reporting logic, such as monitors and/or logic for conflict detection/reporting, as well as status registers to report the conflicts.

However, any combination of conditions and scenarios may be considered invalidating for a transaction or critical section. Examples of factors, which may be considered for non-commit of a transaction, includes detecting a conflict to a transactionally accessed memory location, losing monitor information, losing buffered data, losing metadata associated with a transactionally accessed data item, and detecting an other invalidating event, such as an interrupt, ring transition, or an explicit user instruction.

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads.

In contrast, as another example, a cache memory (e.g. data cache 150) is utilized to buffer the updates, while providing the same transactional or lock elision buffering functionality. Here, cache 150 is capable of holding data items in a buffered coherency state, which may include a full new coherency state or a typical coherency state with a write monitor set to indicate the associated line holds tentative write information. In the first case, a new buffered coherency state is added to a cache coherency protocol, such as a Modified Exclusive Shared Invalid (MESI) protocol to form a MESIB protocol. In response to local requests for a buffered data item—data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system (i.e. not made globally visible, until after commit). Instead, the transaction may abort or the evicted line may be stored in a speculative structure between the data cache and the higher level cache memories, such as a victim cache. Upon commit, the buffered lines are transitioned to a modified state to make the data item globally visible. Note the same action/responses, in another embodiment, are taken when a normal MESI protocol is utilized in conjunction with read/write monitors, instead of explicitly providing a new cache coherency state in a cache state array; this is potentially useful when monitors/attributes are included elsewhere (i.e. not implemented in cache 150's state array). But the actions of control logic in regards to local and global observability remain relatively the same.

Note that the terms internal and external are often relative to a perspective of a thread associated with execution of a transaction/critical section or processing elements that share a cache. For example, a first processing element for executing a software thread associated with execution of a transaction or a critical section is referred to a local thread. Therefore, in the discussion above, if a store to or load from an address previously written by the first thread, which results in a cache line for the address being held in a buffered coherency state (or a coherency state associated with a read or write monitor state), is received; then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line and normal cache replacement is utilized to retrieve the unbuffered version of the cache line from higher level memory. In one scenario, this eviction may result in an abort (or at least a conflict between threads that is to be resolved in some fashion). Note from this discussion that reference below to a 'processor' in a transactional (or HLE) mode may refer to the entire processor or only a processing element thereof that is to execute (or be associated with execution of) a transaction/critical section.

Although much of the discussion above has been focused on transactional execution, hardware or speculative lock elision (HLE or SLE) may be similarly utilized. As mentioned above, critical sections are demarcated or defined by a programmer's use of lock instructions and subsequent lock release instructions. Or in another scenario, a user is capable of utilizing begin and end critical section instructions (e.g. lock and lock release instructions with associated begin and end hints to demarcate/define the critical sections). In one embodiment, explicit lock or lock release instructions are utilized. For example, in Intel®'s current IA-32 and Intel® 64 instruction set an Assert Lock# Signal Prefix, which has opcode F0, may be pre-pended to some instructions to ensure exclusive access of a processor to a shared memory. Here, a programmer, compiler, optimizer, translator, firmware, hardware, or combination thereof utilizes one of the explicit lock instructions in combination with a predefined prefix hint to indicate the lock instruction is hinting a beginning of a critical section.

However, programmers may also utilize address locations as metadata or locks for locations as a construct of software. For example, a programmer using a first address location as a lock/meta-data for a first hash table sets the value at the first address location to a first logical state, such as zero, to represent that the hash table may be accessed, i.e. unlocked. Upon a thread of execution entering the hash table, the value at the first address location will be set to a second logical value, such as a one, to represent that the first hash table is locked. Consequently, if another thread wishes to access the hash table, it previously would wait until the lock is reset by the first thread to zero. As a simplified illustrative example of an abstracted lock, a conditional statement is used to allow access by a thread to a section of code or locations in memory, such as if lock_variable is the same as 0, then set the lock_variable to 1 and access, locations within the hash table associated with the lock_variable. Therefore, any instruction (or combination of instructions) may be utilized in conjunction with a prefix or hint to start a critical section for HLE.

A few examples of instructions that are not typically considered "explicit" lock instructions (but may be used as instructions to manipulate a software lock) include, a compare and exchange instruction, a bit test and set instruction, and an exchange and add instruction. In Intel®'s IA-32 and IA-64 instruction set, the aforementioned instructions include CMPXCHG, BTS, and XADD, as described in Intel®® 64 and IA-32 instruction set documents discussed above. Note that previously decode logic 125 is configured to detect the instructions utilizing an opcode field or other field of the instruction. As an example, CMPXCHG is associated with the following opcodes: 0F B0/r, REX+0F B0/r, and REX.W+0F B1/r.

In another embodiment, operations associated with an instruction are utilized to detect a lock instruction. For example, in x86 the following three memory micro-operations are used to perform an atomic memory update of a memory location indicating a potential lock instruction: (1) Load_Store_intent (L_S_I) with opcode 0x63; (2) STA with opcode 0x76; and (3) STD with opcode 0x7F. Here, L_S_I obtains the memory location in exclusive ownership state and does a read of the memory location, while the STA and STD operations modify and write to the memory location. In other words, the lock value at the memory location is read, modified, and then a new modified value is written back to the location. Note that lock instructions may have any number of other non-memory, as well as other memory, operations associated with the read, write, modify memory operations. As can be seen from this discussion, use of the phrase "eliding a lock instruction", "lock elision", or other reference to elision regarding a lock instruction potentially refers to elision (omission) of a part of a lock instruction. In one illustrative example, eliding a lock instruction refers to eliding the external store portion of the lock instruction to update/modify the memory location utilized as a software lock.

In addition, in one embodiment, a lock release instruction is a predetermined instruction or group of instructions/operations. However, just as lock instructions may read and modify a memory location, a lock release instruction may only modify/write to a memory location. As a consequence, in one embodiment, any store/write operation is potentially a lock-release instruction. And similar to the begin critical section instruction, a hint (e.g. prefix) may be added to a lock release instruction to indicate an end of a critical section. As stated above, instructions and stores may be identified by opcode or any other known method of detecting instructions/operations.

In some embodiments, detection of corresponding lock and lock release instructions that define a critical section (CS) are performed in hardware. In combination with prediction, hardware may also include prediction logic to predict critical sections based on empirical execution history. For example, predication logic stores a prediction entry to represent whether a lock instruction begins a critical section or not, i.e. is to be elided in the future, such as upon a subsequent detection of the lock instruction. Such detection and prediction may include complex logic to detect/predict instructions that manipulate a lock for a critical section; especially those that are not explicit lock or lock release.

The techniques described above in reference to critical section detection and prediction solely in hardware is often referred to as Hardware Lock Elision (HLE). However, in another embodiment, such detection is performed in a software environment, such as with a compiler, translator, optimizer, kernel, or even application code; this may be referred to herein as (Speculative Lock Elision or Software Lock Elision (SLE)). Although it's common to refer to SLE and HLE interchangeably in some circumstances, as hardware performs the actual lock elision. Here, software determines critical sections (i.e. identifies lock and lock release pairs). And hardware is configured to recognize software's hints/identification, such that the complexity of hardware is reduced, while maintaining the same functionality.

As a first example, a programmer utilizes (or a compiler inserts) xAcquire and xRelease instructions to define critical sections. Here, lock and lock release instructions are augmented/modified/transformed (i.e. a programmer chooses to utilize xAcquire and xRelease or a prefix to represent xAcquire and xRelease is added to bare lock and lock release instructions by a compiler or translator) to hint at a start and end of a critical section (i.e. a hint that the lock and lock release instructions are to be elided). As a result, code utilizing xAcquire and xRelease, in one embodiment are legacy compliant. Here, on a legacy processor that doesn't support SLE, the prefix of xAcquire is simply ignored (i.e. there is no support to interpret the prefix because SLE is not supported), so the normal lock, execute, and unlock execution process is performed. Yet, when the same code is encountered on a SLE supported processor, then the prefix is interpreted correctly and elision is performed to execute the critical section speculatively.

And since memory accesses after eliding the lock instruction are tentative (i.e. they may be aborted and reset back to the saved register checkpoint state), the accesses are tracked/monitored in a similar manner to monitoring hardware transactions, as described above. When tracking the tentative memory accesses, if a data conflict does occur, then the current execution is potentially aborted and rolled back to a register checkpoint. For example, assume two threads are executing on processor 100. Thread 101A detects the lock instruction and is tracking accesses in lower level data cache 110. A conflict, such as thread 102A writing to a location loaded from by thread 101A, is detected. Here, either thread 101A or thread 102A is aborted, and the other is potentially allowed to execute to completion. If thread 101A is aborted, then in one embodiment, the register state is returned to the register checkpoint, the memory state is returned to a previous memory state (i.e. buffered coherency states are invalidated or selected for eviction upon new data requests) and the lock instruction, as well as the subsequently aborted instructions, are re-executed without eliding the lock. Note that in other embodiments, thread 101a may attempt to perform a late lock acquire (i.e. acquire the initial lock on-the-fly within the critical section as long as the current read and write set are valid) and complete without aborting.

Yet, assume tracking the tentative accesses does not detect a data conflict. When a corresponding lock release instruction is found (e.g. a lock release instruction that was similarly transformed into a lock release instruction with an end critical section hint), the tentative memory accesses are atomically committed, i.e. made globally visible. In the above example, the monitors/tracking bits are cleared back to their default state. Moreover, the store from the lock release instruction to change the lock value back to an unlock value is elided, since the lock was not acquired in the first place. Above, a store associated with the lock instruction to set the lock was elided; therefore, the address location of the lock still represents an unlocked state. Consequently, the store associated with the lock release instruction is also elided, since there is potentially no need to re-write an unlock value to a location already storing an unlocked value.

In one embodiment, processor 100 is capable of executing a compiler, optimization, and/or translator code 177 to compile application code 176 to support transactional execution, as well as to potentially optimize application code 176, such as perform re-ordering. Here, the compiler may insert operations, calls, functions, and other code to enable execution of transactions, as well as detect and demarcate critical sections for HLE or transactional regions for RTM.

Compiler 177 often includes a program or set of programs to translate source text/code into target text/code. Usually, compilation of program/application code 176 with compiler 177 is done in multiple phases and passes to transform hi-level programming language code into low-level machine or assembly language code. Yet, single pass compilers may still be utilized for simple compilation. Compiler 177 may utilize any known compilation techniques and perform any known compiler operations, such as lexical analysis, pre-processing, parsing, semantic analysis, code generation, code transformation, and code optimization. The intersection of transactional execution and dynamic code compilation potentially results in enabling more aggressive optimization, while retaining necessary memory ordering safeguards.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler 177 potentially inserts transactional operations, calls, functions, etc. in one or more phases of compilation, such as insertion of calls/operations in a front-end phase of compilation and then transformation of the calls/operations into lower-level code during a transactional memory transformation phase. Note that during dynamic compilation, compiler code or dynamic optimization code 177 may insert such operations/calls, as well as optimize the code 176 for execution during runtime. As a specific illustrative example, binary code 176 (already compiled code) may be dynamically optimized during runtime. Here, the program code 176 may include the dynamic optimization code, the binary code, or a combination thereof.

Nevertheless, despite the execution environment and dynamic or static nature of a compiler 177; the compiler 177, in one embodiment, compiles program code to enable transactional execution, HLE and/or optimize sections of program code. Similar to a compiler, a translator, such as a binary translator, translates code either statically or dynamically to optimize and/or translate code. Therefore, reference to execution of code, application code, program code, a STM environment, or other software environment may refer to: (1) execution of a compiler program(s), optimization code optimizer, or translator either dynamically or statically, to compile program code, to maintain transactional structures, to perform other transaction related operations, to optimize code, or to translate code; (2) execution of main program code including transactional operations/calls, such as application code that has been optimized/compiled; (3) execution of other program code, such as libraries, associated with the main program code to maintain transactional structures, to perform other transaction related operations, or to optimize code; or (4) a combination thereof.

Often within transactional memory environment, a compiler, will be utilized to insert some operations, calls, and other code in-line with application code to be compiled, while other operations, calls, functions, and code are provided separately within libraries. This potentially provides the ability of the software distributors to optimize and update the libraries without having to recompile the application code. As a specific example, a call to a commit function may be inserted inline within application code at a commit point of a transaction, while the commit function is separately provided in an updateable STM library. And the commit function includes an instruction or operation, when executed, to reset monitor/attribute bits, as described herein. Additionally, the choice of where to place specific operations and calls potentially affects the efficiency of application code. As another example, binary translation code is provided in a firmware or microcode layer of a processing device. So, when binary code is encountered, the binary translation code is executed to translate and potentially optimize the code for execution on the processing device, such as replacing lock instruction and lock release instruction pairs with xAcquire and xEnd instructions (discussed in more detail below).

In one embodiment any number of instructions (or different version of current instructions) are provided to aid thread level speculation (i.e. transactional memory and/or speculative lock elision). Here, decoders 125 are configured (i.e. hardware logic is coupled together in a specific configuration) to recognize the defined instructions (and versions thereof) to cause other stages of a processing element to perform specific operations based on the recognition by decoders 125. An illustrative list of such instructions include: xAcquire (e.g. a lock instruction with a hint to start lock elision on a specified memory address); xRelease (e.g. a lock release instruction to indicate a release of a lock, which may be elided); SLE Abort (e.g. abort processing for an abort condition encountered during SLE/HLE execution) xBegin (e.g. a start of a transaction); xEnd (e.g. an end of a transaction); xAbort (e.g. abort processing for an abort condition during execution of a transaction); test speculation status (e.g. testing status of HLE or TM execution); and enable speculation (e.g. enable/disable HLE or TM execution).

Figure 2:
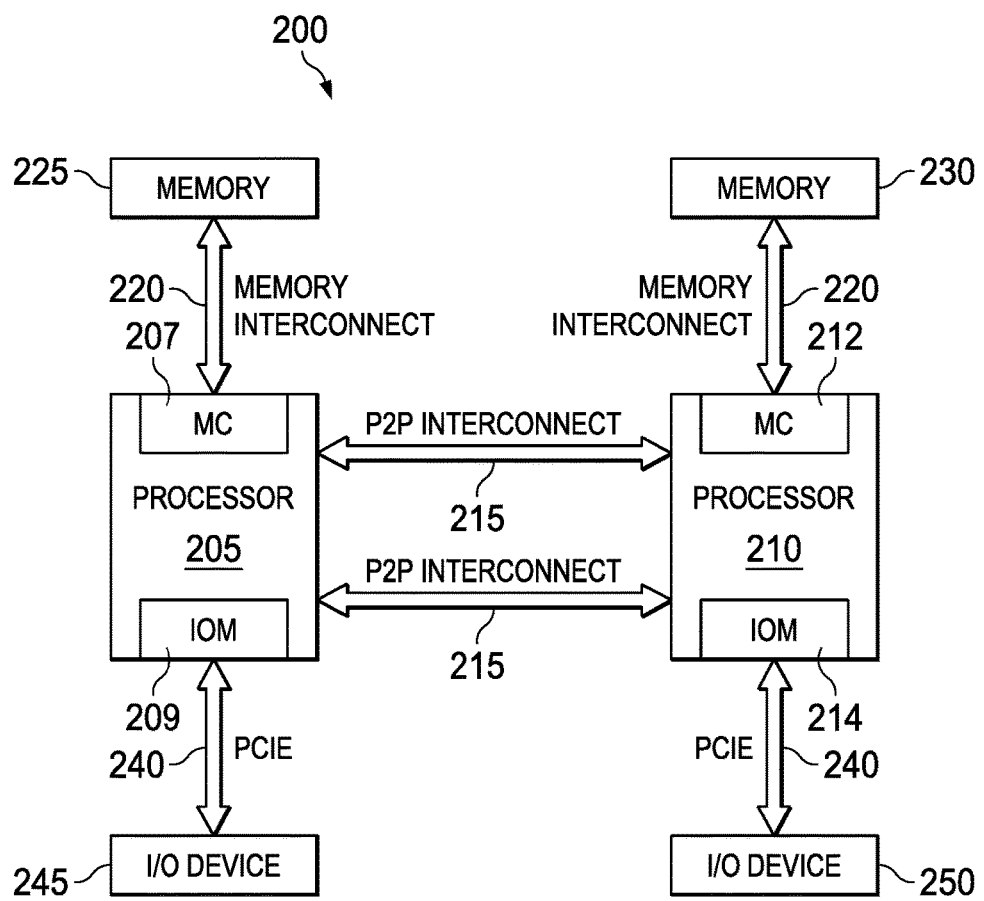
FIG. 2 illustrates an embodiment of a multiprocessor system.
Figure 3:
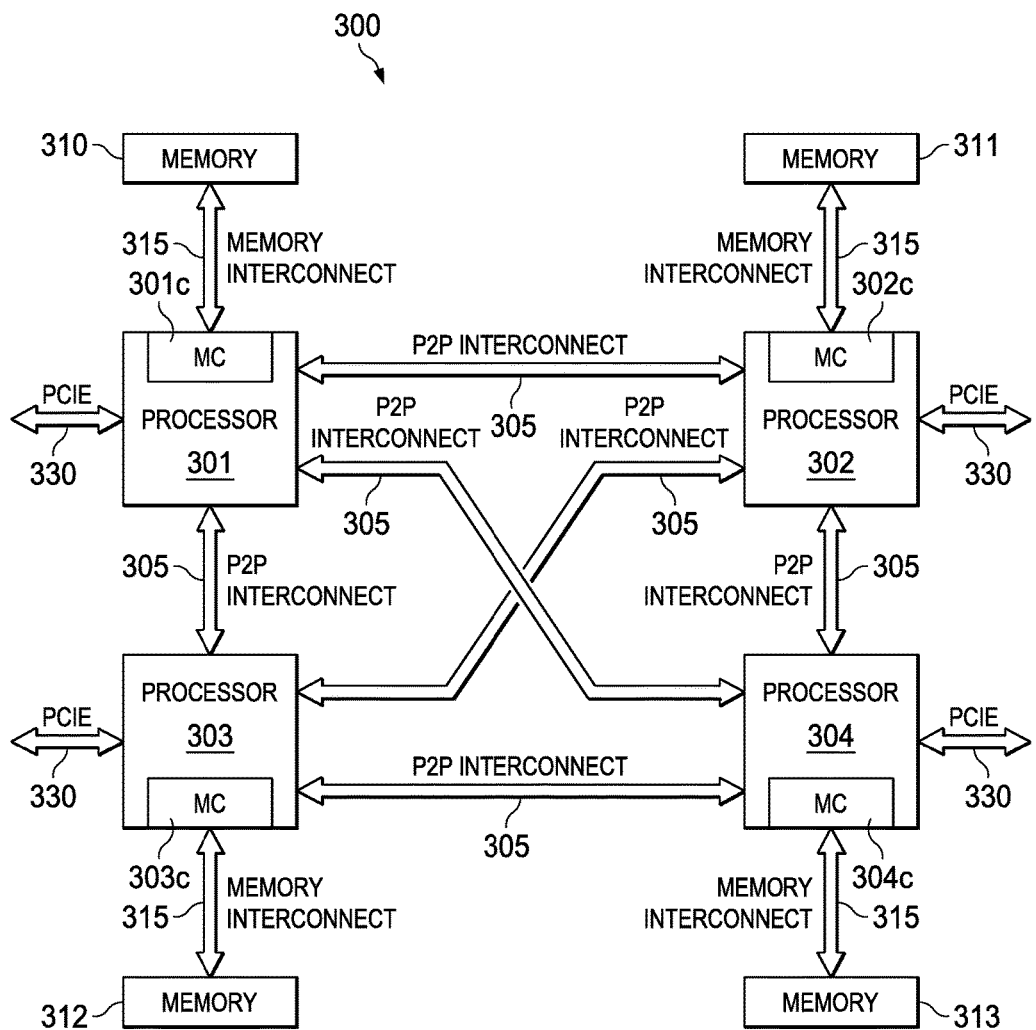
FIG. 3 illustrates another embodiment of a multiprocessor system.
Figure 4:
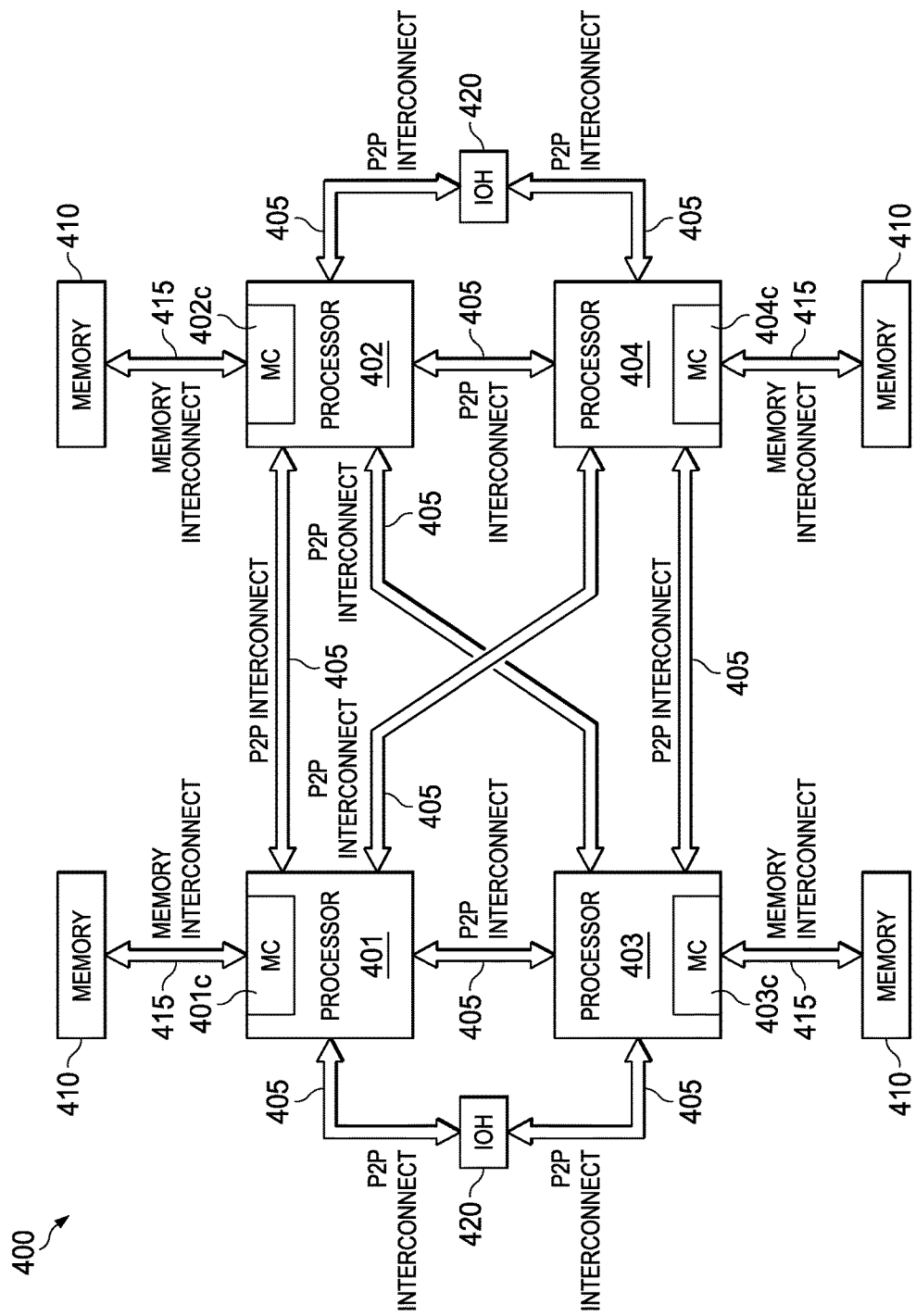
FIG. 4 illustrates another embodiment of a multiprocessor system.

Referring to FIGS. 2-4, embodiments of a computer system configurations adapted to include processors that are to provide abort control mechanisms are illustrated. In reference to FIG. 2, an illustrative example of a two processor system 200 with an integrated memory controller and Input/Output (I/O) controller in each processor 205, 210 is depicted. Although not discussed in detail to avoid obscuring the discussion, platform 200 illustrates multiple interconnects to transfer information between components. For example, point-to-point (P2P) interconnect 215, in one embodiment, includes a serial P2P, bi-directional, cache-coherent bus with a layered protocol architecture that enables high-speed data transfer. Moreover, a commonly known interface (Peripheral Component Interconnect Express, PCIE) or variant thereof is utilized for interface 240 between I/O devices 245, 250. However, any known interconnect or interface may be utilized to communicate to or within domains of a computing system. FIG. 2 also illustrates a first memory 225 coupled to a memory controller (MC) 207 of processor 205 over a memory interconnect 220 and a second memory 230 coupled to MC 212 of processor 210 over memory interconnect 220. In addition, I/O device 245 is coupled to IOM 209 of processor 205 over a PCIE interface 240 and I/O device 250 is coupled to IOM 214 of processor 210 over PCIE interface 240.

Turning to FIG. 3 a quad processor platform 300 is illustrated. As in FIG. 2, processors 301-304 are coupled to each other through a high-speed P2P interconnect 305. FIG. 3 also illustrates a separate memory 310-313 coupled to a respective memory controller 301c-304c of a processor 301-304 over a memory interconnect 315. In addition, FIG. 3 illustrates a PCIE 330 coupled to each processor 301-304. And processors 301-304 include integrated controllers 301c-304c. FIG. 4 depicts another quad core processor platform 400 with a different configuration. Here, instead of utilizing an on-processor I/O controller to communicate with I/O devices over an I/O interface, such as a PCI-E interface, the P2P interconnect is utilized to couple the processors and I/O controller hubs 420. Hubs 420 then in turn communicate with I/O devices over a PCIE-like interface. Each processor 401-404 illustrated in FIG. 4 includes a MC 401c-404c, respectively, coupling the processor over a memory interconnect 415 to a memory 410. in addition, each processor 401-404 is coupled to an I/O controller hub 420 over a P2P interconnect 405.

Figure 5:
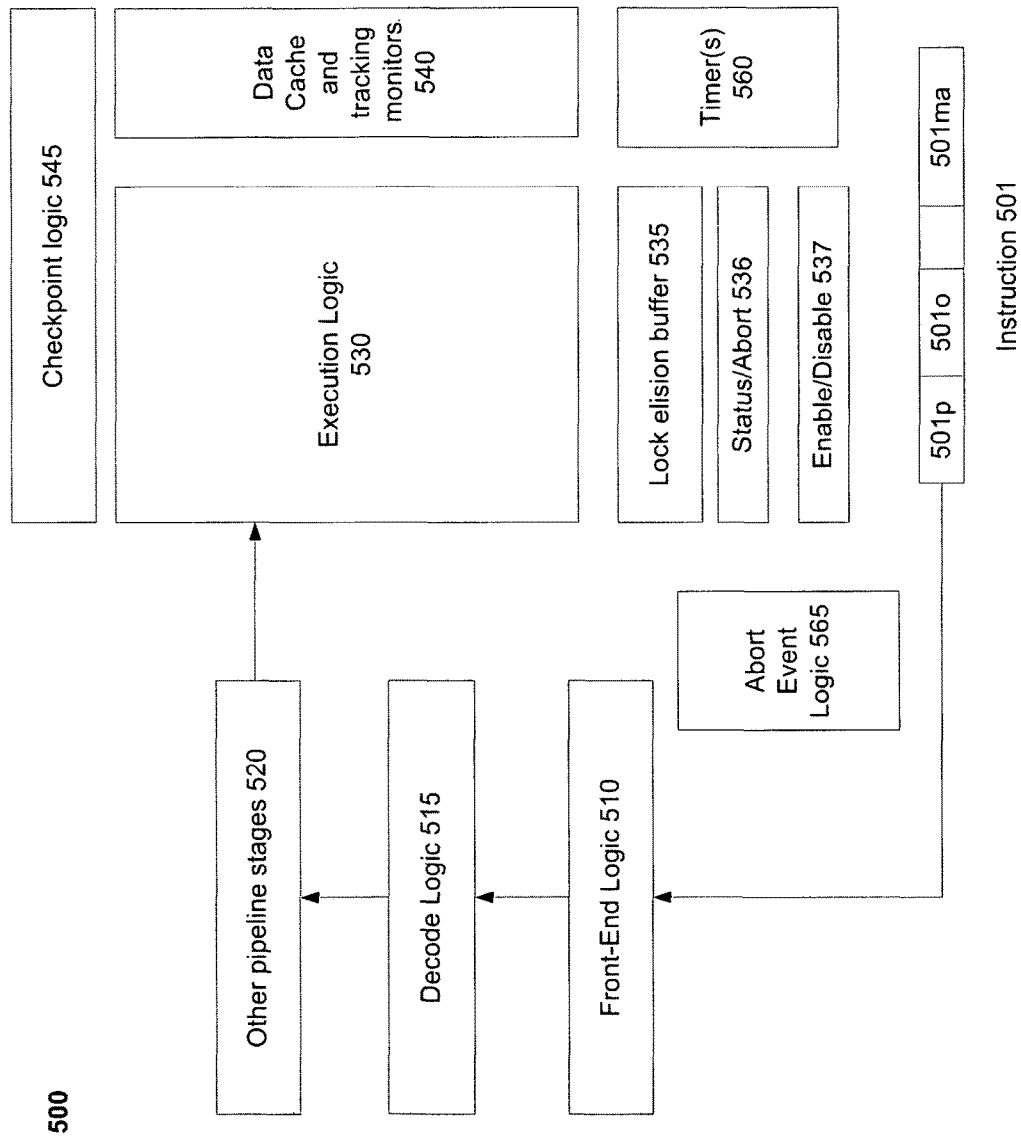
FIG. 5 illustrates an embodiment of a logical representation of modules for a processor to provide abort control mechanisms.

Referring next to FIG. 5, an embodiment of modules/logic to provide abort control mechanisms is illustrated. As an example, single instruction 501 is illustrated; however, numeral 501 will be discussed in reference to a number of instructions that may be supported by processor 500 for thread level speculation (e.g. exemplary instruction implementations are demonstrated through pseudo code in FIGS. 6-7). Specifically, a single instruction (instruction 501) is shown for simplicity. However, as each example and figure is discussed, different instructions are presented in reference to instruction 501. In one scenario, instruction 501 is an instruction that is part of code, such as application code, user-code, a runtime library, a software environment, etc. And instruction 501 is recognizable by decode logic 515. In other words, an Instruction Set Architecture (ISA) is defined for processor 500 including instruction 501, which is recognizable by operation code (op code) 501o. So, when decode logic 515 receives an instruction and detects op code 501o, it causes other pipeline stages 520 and execution logic 530 to perform predefined operations to accomplish an implementation or function that is defined in the ISA for specific instruction 501. An enable/disable component 537 is also illustrated in FIG. 5.

As discussed above, two types of thread level speculation techniques are primarily discussed herein—transactional memory (TM) and speculative lock elision (SLE). Transactional memory, as described herein, includes the demarcation of a transaction (e.g. with new begin and end transactional instructions) utilizing some form of code or firmware, such that a processor that supports transactional execution (e.g. processor 500) executes the transaction tentatively in response to detecting the demarcated transaction, as described above. Note that a processor, which is not transactional memory compliant (i.e. doesn't recognize transactional instructions, which are also viewed as legacy processors from the perspective of new transactional code), are not able to execute the transaction, since it doesn't recognize a new opcode 501o for transactional instructions.

In contrast, SLE (in some embodiments) is made legacy compliant. Here, a critical section is defined by a lock and lock release instruction. And either originally (by the programmer) or subsequently (by a compiler or translator) the lock instruction is augmented with a hint to indicate locks for the critical section may be elided. Then, the critical section is executed tentatively like a transaction. As a result, on an SLE compliant processor, such as processor 500, when the augmented lock instructions (e.g. lock instructions with associated elision hints) are detected, hardware is able to optionally elide locks based on the hint. And on a legacy processor, the augmented portions of the lock instructions are ignored, since the legacy decoders aren't designed or configured to recognize the augmented portions of the instruction. Note that in one scenario, then augmented portion is an intelligently selected prefix that legacy processors were already designed to ignore, but newly designed processors will recognize. Consequently, on legacy processors, the critical section is executed in a tradition manner with locks. Here, the lock may serialize threaded access to shared data (and therefore execution), but the same code is executable on both legacy and newly designed processors. So, processor designers don't have to alienate an entire market segment of users that want to be able to use legacy software on newly designed computer systems.

To provide an illustrative operating environment for a better understanding, two oversimplified execution examples—execution of a critical section utilizing SLE and execution of a transaction utilizing TM—are discussed in reference to processor 500 of FIG. 5.

Starting with the first example, assume program code includes a critical section. The start of the critical section, in this example, is defined by a lock acquire instruction 501; whether utilized by the programmer or inserted by compiler/translator/optimizer code. As discussed above, a lock acquire instruction includes a previous lock instruction (e.g. identified by opcode 501o) augmented with a hint (e.g. prefix 501p). In one embodiment, a lock acquire instruction 501 includes an xAcquire instruction with a SLE hint prefix 501p added to a previous lock instruction. Here, the SLE hint prefix 501p includes a specific prefix value that indicates to decode logic 515 that the lock instruction referenced by opcode 501o is to start a critical section.

As stated above, a previous lock instruction may include an explicit lock instruction. For example, in Intel®'s current IA-32 and Intel®®64 instruction set an Assert Lock# Signal Prefix, which has opcode F0, may be pre-pended to some instructions to ensure exclusive access of a processor to a shared memory. Or the previous lock, acquire instruction includes instructions that are not "explicit," such as a compare and exchange instruction, a bit test and set instruction, and an exchange and add instruction. In Intel®'s IA-32 and IA-64 instruction set, the aforementioned instructions include CMPXCHG, BTS, and XADD, as described in Intel®® 64 and IA-32 instruction set documents. In these documents CMPXCHG is associated with the following opcodes: 0F B0/r, REX+0F B0/r, and REX.W+0F B1/r. Yet, a lock acquire instruction (in some embodiments) is not limited to a specific instruction, but rather the operations thereof. For example, in x86 the following three memory micro-operations are used to perform an atomic memory update of a memory location indicating a potential lock instruction: (1) Load_Store_Intent (L_S_I) with opcode 0x63; (2) STA with opcode 0x76; and (3) STD with opcode 0x7F. Here, L_S_I obtains the memory location in exclusive ownership state and does a read of the memory location, while the STA and STD operations modify and write to the memory location. In other words, the lock value at the memory location is read, modified, and then a new modified (locked) value is written back to the location. Note that lock instructions may have any number of other non-memory, as well as other memory, operations associated with the read, write, modify memory operations.

In a first usage of xAcquire 501, a programmer creating application or program code utilizes xAcquire to demarcate a beginning of a critical section that may be executed using SLE (i.e. either through a higher-level language or other identification of a lock instruction that is translated into SLE hint prefix 501p associated with opcode). Essentially, a programmer is able to create a versatile program that is able to run on legacy processors with traditional locks or on new processors utilizing HLE. In another usage, either as part of legacy code or by the choice (or lack of knowledge of newer programming techniques) of the programmer, a traditional lock instruction (examples of which are discussed immediately above) is utilized. And code (e.g. a static compiler, a dynamic compiler, a translator, an optimizer, or other code) detects critical sections within the program code. The detection is not discussed in detail; however, a few examples are given. First, any of the instructions or operations above are identified by the code and replaced or modified with xAcquire instruction 501. Here, prefix 501p is appended to previous instruction 501 (i.e. opcode 501o with any other instruction and addressing information, such as memory address 501ma). As another example, the code tracks stores/loads of application code and determines lock and lock release pairs that define a potential critical section. And as above, the code inserts xAcquire instruction 501 at the beginning of the critical section.

In a very similar manner, xRelease is utilized at the end of a critical section. Therefore, whether the end of a critical section (e.g. a lock release) is identified by the programmer or by subsequent code, xRelease is inserted at the end of the critical section. Here, xRelease instruction 501 has an opcode that identifies an operation, such as a store operation to release a lock (or a no-operation in an alternative embodiment), and a xRelease prefix 501p to be recognized by SLE configured decoders.

In response to decoding xAcquire 501, processor 500 enters HLE mode. HLE execution is then started i. In one embodiment, the current register state is checkpointed (stored) in checkpoint logic 545 in case of an abort. And memory state tracking is started (i.e. the hardware monitors described above begin to track memory accesses from the critical section). For example, accesses to a cache are monitored to ensure the ability to roll-back (or discard updates to) the memory state in case of an abort. If the lock elision buffer 535 is available, then it's allocated, address and data information is recorded for forwarding and commit checking, and elision is performed (i.e. the store to update a lock at the memory address 501ma is not performed). In other words, processor 500 does not add the address of the lock to the transactional region's write-set nor does it issue any write requests to the lock. Instead, the address of the lock is added to the read set, in one example. And the lock elision buffer 535, in one scenario, includes the memory address 501ma and the lock value to be stored thereto. As a result, a late lock acquire or subsequent execution may be performed utilizing that information. However, since the store to the lock is not performed, then the lock globally appears to be free, which allows other threads to execute concurrently with the tracking mechanisms acting as safeguards to data contention. Yet, from a local perspective, the lock appears to be obtained, such that the critical section is able to execute freely. Note that if lock elision buffer 535 is not available, then in response the lock operation is executed atomically without elision.

As can be seen, within the critical section, execution behaves like a transaction (free, concurrent execution with monitors and contention protocols to detect conflicts, such that multiple threads are not serialized unless an actual conflict is detected). Note that SLE/HLE enabled software is provided the same forward progress guarantees by processor 500 as the underlying non-HLE lock-based execution. In other words, if tentative or speculative execution of a critical section with HLE fails, then the critical section may be re-executed with a legacy locking system. Also, in some embodiment, processor 500 is able transition to non-transactional execution without performing a transactional abort.

Once the end of the critical section is reached, then the xRelease instruction 501 is fetched by the front-end logic 510 and decoded by decode logic 515. As stated above, xRelease instruction 501, in one embodiment, includes a store to return the lock at memory address 501ma back to an unlocked value. However, if the original store from the xAcquire instruction was elided, then the lock at memory address 501 ma is still unlocked (as long as not other thread has obtained the lock). Therefore, the store to return the lock in xRelease is unnecessary.

Consequently, decoders 515 are configured to recognize the store instruction from opcode 501o and the prefix 501p to hint that lock elision on the memory address 501ma specified by xAcquire and/or xRelease is to be ended. Note that the store or write to lock 501ma is elided when xRelease is to restore the value of the lock to the value it had prior to the XACQUIRE prefixed lock acquire operation on the same lock. However, in a versioning system (i.e. incrementing metadata values in locks to determine a most recent transaction/critical section to commit) the lock value may be incremented. Here, xRelease is to hint at an end to elision, but the store to memory address 501ma is performed. A commit of the critical section is completed, elision buffer 535 is deallocated, and HLE mode is exited.

As mentioned above, in some legacy hardware implementations that do not include HLE support, the XACQUIRE and XRELEASE prefix hints are ignored. And as a result, elision will not be performed, since these prefixes, in one embodiment, correspond to the REPNE/REPE IA-32 prefixes that are ignored on the instructions where XACQUIRE and XRELEASE are valid. Moreover, improper use of hints by a programmer will not cause functional bugs, as elision execution will continue correct, forward progress.

As aforementioned, if an abort condition (data contention, lock contention, mismatching lock address/values, etc.) is encountered, then some form of abort processing may be performed. Just as transactional memory and HLE are similar in execution, they may also be similar in portions of abort processing. For example, checkpointing logic 545 is utilized to restore a register state for processor 500. And the memory state is restored to the previous critical section state in data cache 540 (e.g. monitored cache locations are invalidated and the monitors are reset). Therefore, in one embodiment, the same or a similar version of the same abort instruction (xAbort 501) is utilized for both SLE and TM. Yet in another embodiment, separate xAbort instructions (with different opcodes and/or prefixes) are utilized for HLE and TM. Moreover, abort processing for HLE may be implicit in hardware (i.e. performed as part of hardware in response to an abort condition without an explicit abort instruction). In some implementations, the abort operation may cause the implementation to report numerous causes of abort and other information in either a special register or in an existing set of one or more general purpose registers. The control mechanisms for aborting a speculative code region are discussed in more detail below.

As a reminder, two oversimplified execution examples— execution of a critical section utilizing SLE and execution of a transaction utilizing TM—are currently being discussed. The exemplary execution of a critical section utilizing xAcquire and xRelease has been covered. Therefore, the description now moves to discussion of exemplary execution of a transaction using transactional memory—also referred to as Restricted Transactional Memory (RTM) or Hardware transactional Memory (HTM)—techniques.

Much like a critical section, a transaction is demarcated by specific instructions. However, in one embodiment, instead of a lock and lock release pair with prefixes, the transaction is defined by a begin (xBegin) transaction instruction and end (xEnd) transaction instruction (e.g. new instructions instead of augmented previous instructions). And similar to SLE, a programmer may choose to use xBegin and xEnd to mark a transaction. Or software (e.g. a compiler, translator, optimizer, etc.) detects a section of code that could benefit from atomic or transactional execution and inserts the xBegin, xEnd instructions.

As an example, a programmer uses the XBEGIN instruction to specify a start of the transactional code region and the XEND instruction to specify the end of the transactional code region. Therefore, when a xBegin instruction 501 is fetched by fetch logic 510 and decoded by decode logic 515, processor 500 executes the transactional region like a critical section (i.e. tentatively while tracking memory accesses and potential conflicts thereto). And if a conflict (or other abort condition) is detected, then the architecture state is rolled back to the state stored in checkpoint logic 545, the memory updates performed during RTM execution are discarded, execution is vectored to the fallback address provided by the xBegin instruction 501, and any abort information is reported accordingly. Here, an XEND instruction is to define an end of a transaction region. Often the region execution is validated (ensure that no actual data conflicts have occurred) and the transaction is committed or aborted based on the validation in response to an XEND instruction. In some implementations, XEND is to be globally ordered and atomic. Other implementations may perform XEND without global ordering and require programmers to use a fencing operation. The XEND instruction, in one embodiment, may signal a general purpose exception (#GP) when used outside a transactional region.

The two examples of speculative code region execution— HLE and RTM—have been discussed above. And in reference to both of these examples, the focus on instructions and the format thereof has been on the boundary instructions (e.g. acquire, release, begin, and end). However, discussion of the instructions available within a speculative code region is also worthwhile.

In one embodiment, once a speculative code region is started by an XAQURIE OR XBEGIN, then the subsequent instruction are, by default, assumed to be speculative (i.e. transactional). Here, a programmer includes a new XBEGIN instruction for a transaction. But the memory access operations are typical, previous memory instructions, such as MOV rxx, mxx. And since they are included within a defined transaction, they instructions are treated as transactional memory access operations.

In an alternative embodiment, instructions/operations within a code region are, by default, non-transactional. Here, new transactional memory access operations (either identified by new opcodes or new prefixes added to old instructions) are utilized. As an example, if a previous MOV r32, m32 instruction is utilized within a transaction, then it's treated non-transactionally by default; which in some cases may cause an abort. However, if the MOV r32, m32 is associated with a transactional prefix or an XNMOV r32, m32 with a new transactional opcode is utilized then the instruction is treated transactionally.

Although alternative embodiments for how operations within a specualtive code region are discussed above, in another embodiment, transactional and non-transactional operations, may be mixed within a speculative code region. Here, assume operations within a speculative code region are treated trasnsactionally (or tentatively) by default. In this scenario, the ISA may define explicit non-transactional instructions, such as XNMOV r32, m32 and XNMOV m32,r32, that allow a programmer to 'escape' the speculative nature of a code region and perform a non-transactional memory operation. Also note that, in one embodiment, different defaults may be utilized for HLE versus TM. For example, within HLE sections operations may be interpreted as non-transactional in nature, since the original programmer may have initially contemplated non-transactional operations protected by locks, while a compiler or other software transformed this code region into a critical section to be executed by lock elision. And in this example, TM sections may by interpreted by default as transactional.

In both instances of the example speculative code region execution (e.g. HLE and TM) there was mention of aborting the speculative code regions. And furthermore, there was some discussion of how the end result abort processing may be performed (i.e. checkpoint logic 545 rolls-back an architectural state of processor 500—or the processing element of processor 500—to a checkpoint at the start of the speculative code region and the tentative updates to memory (memory state) are discarded in cache 540. Yet, to this point there has been no specific discussion of how the abort decision is made or the control mechanisms thereof In one embodiment, processor 500 includes abort event logic 565 configured to track potential speculative code region abort events. And a decision is made whether a speculative code region is to abort based on policies defined in hardware, firmware (e.g. microcode), code (e.g. privileged hypervisor or application code), or a combination thereof. As illustrated, abort event logic 565 is illustrated as separate from other logic/modules of processor 500. However, just as the other depicted representations of logical modules may cross/overlap other boundaries, so may abort event logic 565.

For example, a common speculative code region abort event includes detection of a conflict regarding a memory address within the code region's read or write set. Here, assume cache 540 includes a cache line with a read monitor set for a current speculative code region. And a snoop to write from another processing element on processor 500 is made to the cache line, so the other processing element can obtain the line in an exclusive state and modify it. In this scenario, cache control logic indicates a conflict (i.e. the cache line is marked as transactionally read as part of the read set and an external processing element wants to write to the line). Therefore, in one embodiment (as discussed in more detail below) this conflict is recorded in abort status register 536. As can be seen from this example, detection of the potential abort event was purely made within cache 540. But in one embodiment, reference to abort event logic 565 includes cache 540's logic to perform the conflict detection. As can be seen, any defined abort event may have distributed logic to detect the abort event. As another example, timer(s) 560 may be utilized to timeout a speculative code region to ensure forward progress. So the timer and expiration thereof, in one embodiment, is considered within or part of abort event logic 565.

Once one or more aborts are defined (i.e. tracked in register 536), then the interpretation of the potential abort event becomes the topic of conversation. In one embodiment, hardware defines the abort policy. As an example, abort storage element 536 holds a representation of detected abort events. And logic combinations are configured in a specific manner to define what abort events are ignored or cause an abort of the code speculative region. As a purely oversampled and illustrative example, assume a hardware designer always wants to abort when an explicit abort instruction is detected or when a data conflict is detected. Here, assuming a logical high represents an abort occurring and a logical high output initiates and actual abort, then an OR logical gate (or inverted NOR gate) is coupled to the bit positions of abort status register 536 corresponding to the data conflict and explicit abort events. Therefore, if either bit position is set high upon an occurrence of the event, then the resulting logical high from the OR logical gate for an abort control signal initiates an abort of the speculative code region. Extrapolating from this simple example, hardware may predefine abort events that are handled normally, ignored, or sent to firmware or software for interpretation. And in one implementation, hardware may allow firmware or software to dynamically update its default abort policies (i.e. control mechanisms). Moreover, in some implementations, it may be advantageous to enable an 'always abort' speculative code region, so designers/programmers are able to test/debug abort fall back paths (e.g. a fall back defined in hardware, a fall back defined by an XBEGIN instruction, and/or a fall back defined by an XBORT argument). Here, one or more bits in a register, such as abort register 536 is set (by hardware, firmware, and/or software) to an abort value to indicate to hardware that all speculative code regions are to be aborted. In this scenario, hardware automatically interprets the always abort indication as an abort.

In the previous example, hardware defined the potential abort events for detection and defined what scenario (single or combination of those events) would cause an abort of a speculative code region. However, in other embodiments, both the definition of abort events to track and the scenarios for causing an abort may be defined by hardware, firmware, software, or a combination thereof. As an example, a mask may provide access to different privilege levels of software to abort register 536 to define what abort events to track. Note the mask may allow hardware to predefine a few abort events that are always tracked (and/or always cause an abort) to guarantee forward progress, while enabling software to turn on/off tracking of other abort events/conditions. Furthermore, different levels of decisions may be made (e.g. hardware makes an initial determination of whether or not to even inform code of the abort conditions tracked; and if software is informed, then it makes a decision whether to abort based on the informed abort events). Or in another embodiment, hardware automatically initiates an abort of a speculative code region when specific abort conditions (e.g. an explicit abort instruction, data conflict, memory operation type, timer expiration etc.) are detected. But hardware leaves the decision for other abort conditions (e.g. memory ordering, internal buffer overflow, or an I/O access) to software.

Figure 6:
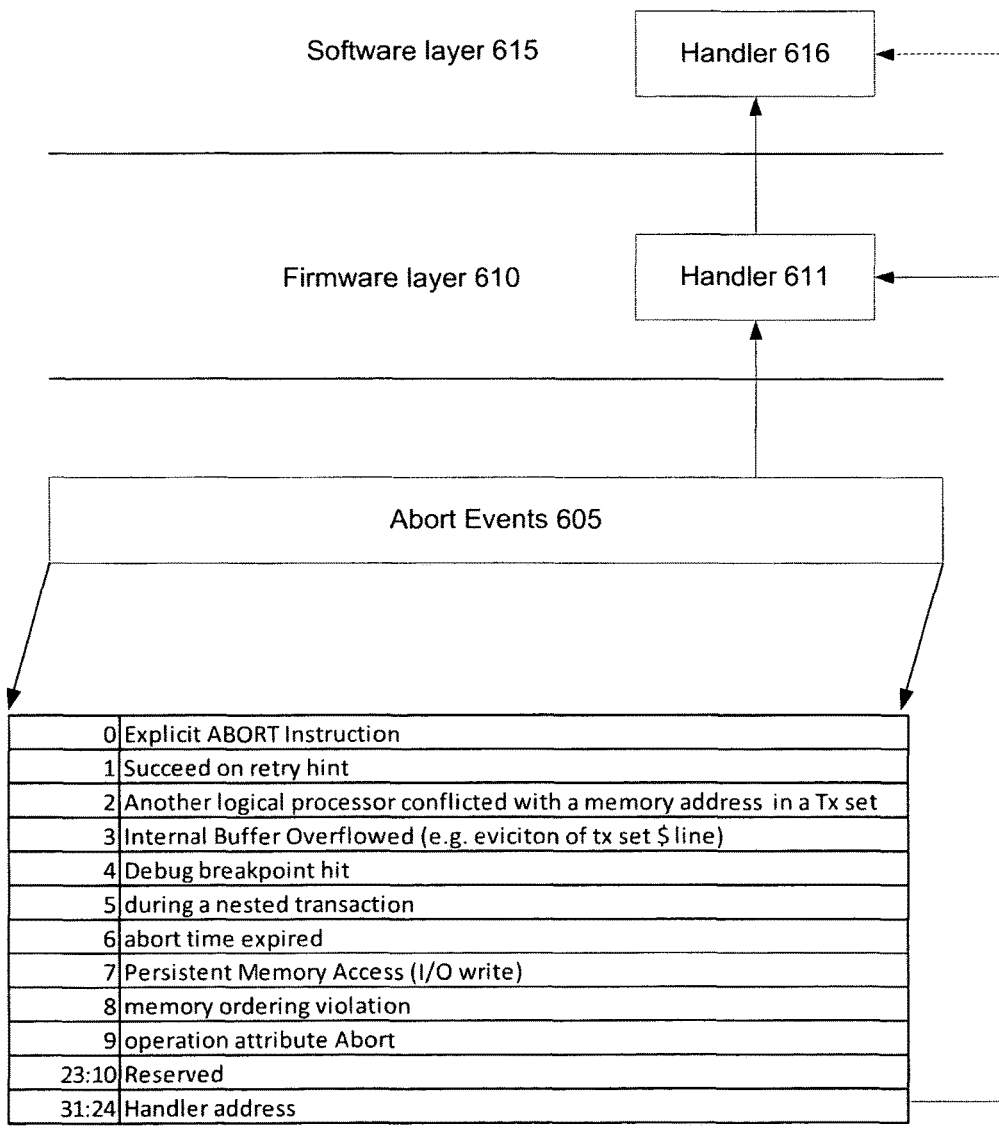
FIG. 6 illustrates an embodiment of a logical representation of modules for an abort control mechanism.

Turning to FIG. 6, an embodiment of a layered approach for speculative abort control mechanisms is illustrated. Here, abort events register 605 defines a plurality of abort events that may be tracked. In one embodiment, hardware, firmware, software, or a combination thereof may enable or disable tracking of one or more of the abort events. And similarly, in one implementation, hardware, firmware, software, or a combination thereof is able to specify what abort events (or scenario of abort events) is to be ignored, treated normally, sent to firmware 610, sent to software 615, or cause an abort.

As depicted, register 605 includes a bit map of bit positions that each represents an abort condition/event. However, it's important to note that this is purely illustrative. More than one bit position may be utilized to define an abort condition. And different abort events may be represented in more than one storage element, instead of in a single register (as depicted). As an illustrative list of potential abort events includes: an explicit abort instruction (e.g. XABORT recognized as part of an ISA for a processor including register 605); a memory address conflict (e.g. an external logical processor writes to a speculatively read location, read from a location speculatively written, and/or acquire a lock for a speculative code region); a buffer overflow (e.g. a line from cache that is marked as speculatively accessed is evicted indicating the cache is not able to hold all of the speculative information); a debug breakpoint hit (e.g. a point in the speculative code region is hit to break execution for debug); a nested transaction event (e.g. an abort during a nested transaction or exceeding a maximum nested transaction depth); an abort timer expiration (e.g. a timer expires indicating a speculative code region is to abort); a persistent memory access (e.g an I/O write when it's not allowed); a memory ordering violation; an operation attribute abort (e.g. an disallowed memory type, disallowed attribute information—i.e. general, system, x87, Mult-Media eXtensions (MMX), Single Instruction Multiple Data (SIMD), SIMD Extensions (SSE), Virtual Machine eXtensions (VMX), Safer Mode eXtensions (SMX), or other known attributes that may be not allowed based on designer selection, disallowed prefix, or other disallowed operation related information); a parity error; an ECC error, an assist, a fault, an asynchronous event (e.g. an interrupt); an expiration of other timers (e.g. VMXTIMER), etc. Note from the discussion above that register 605 may also have an 'always abort' bit that will cause all speculative code regions to abort when set. In different implementations, a designer allows hardware, firmware, privileged software, user-level software or a combination thereof to access the 'always abort' bit.

As stated above, tracking of one or more abort events, in one embodiment, are capable of being enabled/disabled. As an example, microcode, privileged level code (e.g OS or virtual machine monitor), and/or user-level software (e.g. application/program code) is able to access an enable/disable register, such as a mask, to enable/disable tracking (or recording) of abort events. As an example, different levels of access to register 605 may be provided based on privilege level (e.g. hardware reserves abort conditions, such as entry 0 and 2; a hypervisor or privileged level software may enable/disable 3-9, and user-level software may enable/disable 6-9). Note that 'scenarios' (e.g. a combination of abort events) may similarly be defined.

When an abort condition is detected (i.e. the corresponding bit in register 605 is set based on the detecting the event), then it's determined if an abort of a current speculative code region is to be performed. Just as above with tracking, hardware, firmware layer 610, software layer 615, or a combination thereof makes the abort decision based on the information residing in abort register 605. In one embodiment, hardware defines specific events that trigger an abort. And the abort itself may also be handled solely in hardware (e.g. rollback of architecture state with checkpoint logic and discarding speculative memory state from memory). Or hardware determines an abort is to occur and passes the abort control over to firmware layer 610 (e.g. microcode) and/or software layer 615 (e.g. hypervisor or user-level code) to manage the abort processing. In another embodiment, firmware layer 610 and/or software layer 615 defines conditions that cause an abort. Here, setting a corresponding bit may cause an asynchronous transfer to firmware layer 610 or software layer 615 to perform an abort decision based on the defined conditions. Or register 605 is synchronously polled. Either way, based on a detected abort event, firmware 610/software 615 makes an abort determination in this embodiment.

Yet, in another embodiment, a combination of hardware, firmware 610, and software 615 is utilized to make abort determinations. Here, hardware tracks abort events in register 605. And hardware is able to determine if a detected abort even is to be handled normally (i.e. immediately cause an abort and rollback), ignored (i.e. doesn't cause an abort), or sent/transferred to a microcode handler 611 in firmware layer 610 to make a decisions. In other words, hardware operates as a first pass, where obvious (non-complex) abort events/scenarios may be handled. And other abort events are passed up (either to firmware layer 610 or software layer 615 with handler 616 depending on the implementation) for further decision making. Once firmware layer 610 receives the information from hardware, it may make an abort determination (e.g. a second pass or level of determination) or percolate the information up to software layer 615 for the abort determination. In an alternate implementation, hardware tracks abort events in register 605. And firmware 610 and/or software 615 are directly informed of the abort events and make the abort determination (i.e. hardware is only tasked with tracking not abort determination, while the complex nature of abort decision making is left to handlers in microcode, privileged code, or user-level code).

Embodiments of flow diagrams for abort control mechanisms are discussed below in reference to FIGS. 7-8. To provide an illustrative operating environment, these exemplary implementations may be discussed in reference to processor 500 and execution of a 'speculative code region.' Note that a speculative code region (in different embodiments) refers to a transactional code region, critical section, and/or both. As is readily apparent from this note, the discussion below in reference to transactional abort operations may be similarly applied to use in a transactional code region or a critical section.

Before discussion of embodiments for implementations of some abort control mechanisms, it's also important to note that such implementations are depicted in the format of flow diagrams. These flows may be performed by hardware, firmware, microcode, privileged code, hypervisor code, program code, user-level code, or other code associated with a processor. For example, in one embodiment, hardware is specifically configured or adapted to perform the flows. Note that having hardware or logic configured and/or specifically designed to perform one or more flows is different from general logic that is just operable to perform such a flow by execution of code. Therefore, logic configured to perform a flow includes hardware logic designed to perform the flow. Additionally, the actual performance of the flows may be viewed as a method of performing, executing, enabling or otherwise carrying out such abort control mechanisms. Here, code may be specifically designed, written, and/or compiled to perform one or more of the flows when executed by a processing element. However, each of the illustrated flows are not required to be performed during execution. Furthermore, other flows that are not depicted may also be performed. Moreover, the order of operations in each implementation is purely illustrative and may be altered.

Figure 7:
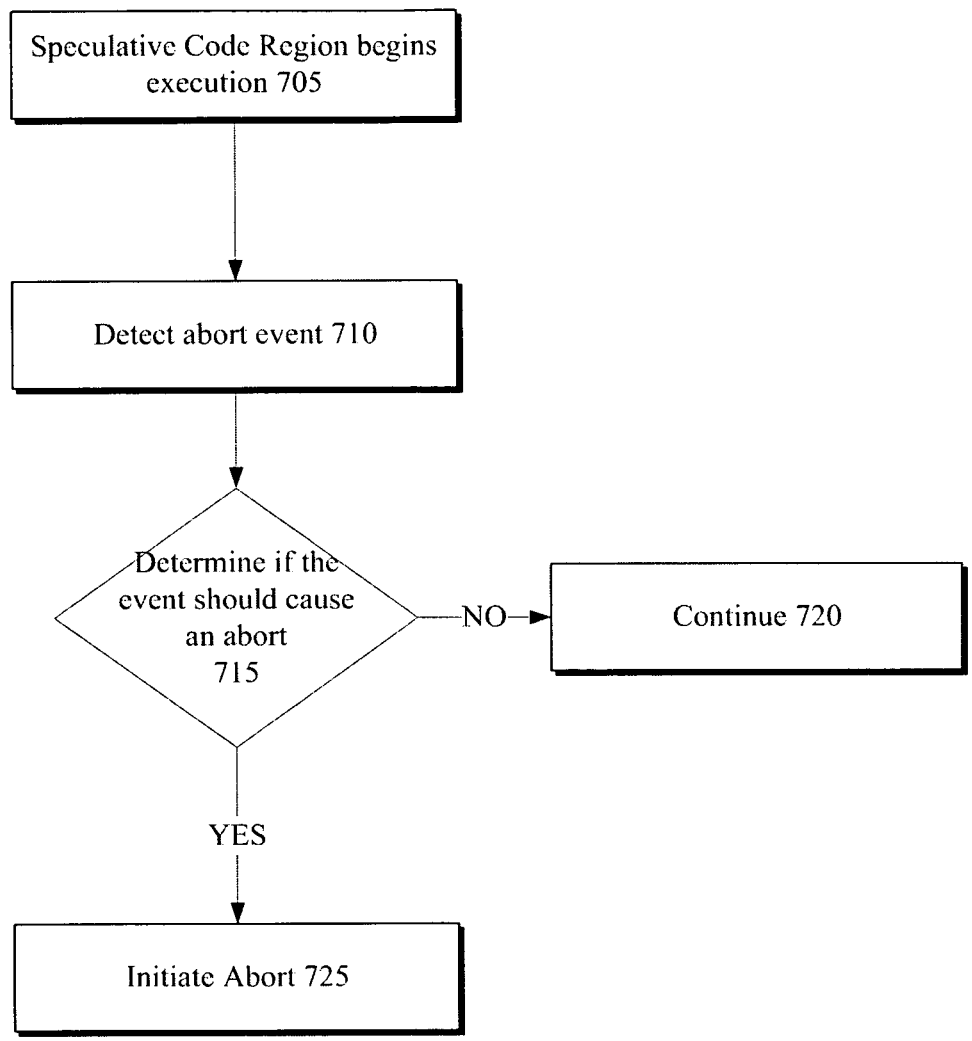
FIG. 7 illustrates an embodiment of a flow diagram for a method of providing an abort control mechanism.

Referring next to FIG. 7, an embodiment of a flow diagram for a method of providing an abort control mechanism is illustrated. Typically, during execution of a speculative code region, once a start instruction (e.g. xACQUIRE or xBEGIN) is encountered, processor 500 (or processing element thereof) enters the corresponding speculation mode (e.g. HLE or RTM) in flow 705. And each of the memory access operations (i.e. loads and stores), in one embodiment, are considered speculative/transactional. Therefore, if a load from memory is encountered, then the processing element in the speculation mode treats it tentatively (i.e. adds the read to the transactional read set, such as marks the memory address loaded from with a cache line monitor as speculatively read).

In flow 710, an abort event is detected. As described above, any known event for aborting a speculative code region may be detected here. In one embodiment, the abort event is recorded/identified in register 536, such as setting a bit in register 536 corresponding to the abort event. However, any known method of tracking an abort event and recording/indicating the event occurred may be utilized.

In flow 715, it's determined if the detected abort event should cause an abort. In one implementation, when one or more specific abort events (e.g. an explicit abort instruction) are tracked in register 536, hardware automatically initiates an abort according to a predefined policy. In other words, hardware includes a predefined policy for aborting based on specific events. In one scenario, this predefined policy may be updated dynamically by firmware or software during runtime. As a result, hardware still makes the determination upon detection of an event. But code is able to setup that predefined policy ahead of time to define which events cause an abort.

In another embodiment, software makes the determination if an abort event should cause an abort. Here, the abort event information is passed up to firmware, a microcode handler, a privileged level handler, a user-level handler, or other code to make the determination. In this scenario, hardware either asynchronously (i.e. in an interrupt-like fashion) informs software of an abort event when a corresponding bit is updated in register 536. Or software synchronously polls, such as a at a commit point to ensure no abort conditions have occurred, register 536 (e.g. a specific abort event information to load from register 536 or test one or more locations of register 536). Either way, once the abort event information from register 536 is received by the code, then it makes the determination in decision flow 715 based on its policy in comparison to the detected abort events.

In yet another embodiment, the determination in flow 715 is not solely reserved by hardware or code, but rather made through cooperation thereof. For example, hardware is set (either by hardware design or software programming) to abort upon specific abort events (i.e. when specific bits in register 536 are set to indicate specific abort events have occurred, then hardware initiates abort processing, which may be carried out in hardware, software, firmware, or a combination thereof). Yet, when other abort events are detected, they are simply ignored, which also may be set by hardware or code. And furthermore, when other abort events are detected, that information is passed up to firmware/software to determine whether they should be treated normally, ignored, or passed up to a higher layer.

Note the discussion above has primarily been in reference to detecting a single abort condition (e.g. an explicit abort instruction) and determining in hardware, firmware, software, or a combination thereof if an abort should be performed in flow 725 or processing continued (i.e. the event ignored) in flow 720. However, such abort conditions and determinations (in some embodiments) are not limited to a single abort event. Instead, hardware, software, firmware, or a combination thereof may define an abort scenario (i.e. a defined combination of more than one abort event) that is to cause an abort. For example, a combination of a nesting depth level (bit 5 from FIG. 6) and a buffer overflow (bit 3 from FIG. 6) is utilized in a scenario. Here, an indication that a maximum nesting depth has been reached is provided (e.g. a nesting depth counter incremented on each XBEGIN instruction reaches a maximum threshold causing bit 5 of register 605 to be set). However, according to the policy in this implementation, an abort is not performed unless bit 3 is set indicating resources have run out. In other words, a maximum nesting depth is provided and tracked, but an abort is not performed unless the internal resources are also overflowed. As can be seen from this example, a scenario may be defined by any combination of abort events being tracked or not tracked, as well as when to abort or not abort based on those scenarios.

Figure 8:
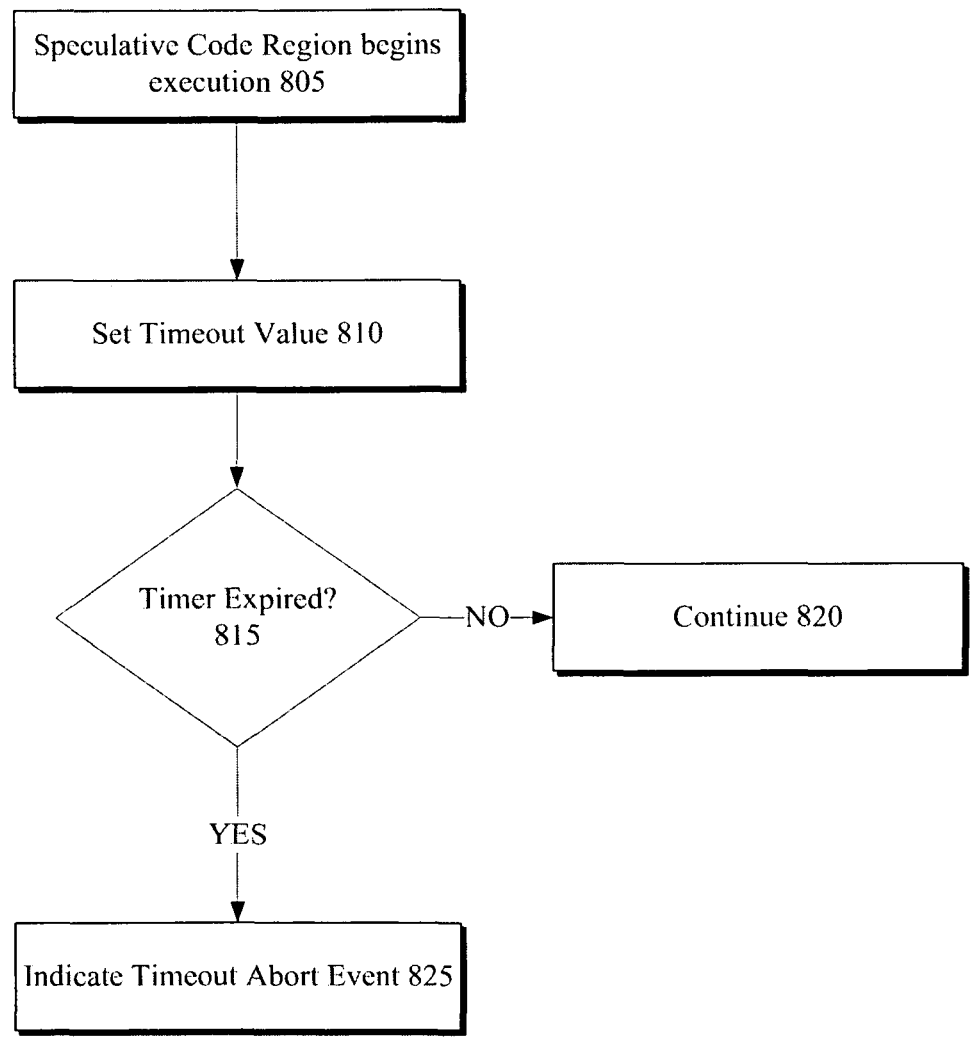
FIG. 8 illustrates another embodiment of a flow diagram for a method of providing an abort control mechanism.

Turning to FIG. 8, an embodiment of flow diagram for a method of an abort control mechanism relating to timers for speculative code regions is illustrated. As above, a speculative code region (e.g. critical section or transaction) is started (e.g. by an XACQUIRE or XBEGIN instruction). One or more timeout values are set for one or more timeout counters (timers) in flow 810. In one embodiment, timers have a default period. Here, a hardware designer may set a typical time for execution of a speculative code region that is proportionate to the available resources for speculative code region execution. In another embodiment, a timer may or may not have a default timeout value, but code (e.g. privileged level code or user-level code) is able to set the timeout value. In this scenario, an XBEGIN instruction or other operation may write a timeout value to a register upon starting the speculative code region in flow 805. And the timer is loaded with the timeout value to begin counting upon starting the speculative code region. Execution continues normally in through flow 820. If an end to the speculative code region is detected before the timer expiration, the timer is merely reset and execution still continues normally in flow 820.

However, if the timer expires in flow 815 before an end to the speculative code region (e.g. XRELEASE or XEND), then the timer expiration is reported, such as in an abort register like register 605, illustrated in FIG. 8 as indicate timeout abort event 825. And hardware, firmware, software, or a combination thereof determines whether to actually abort the speculative code region as discussed above. Above it was stated that there may be one or more timers. For example in one scenario, a timer is provided for each level of allowed nesting, such that each nested critical section is associated with a timer and timeout value. As a result, setting timeout values in flow 810 may be done at the start of each nested critical section. Here, the timeout value is not required to be constant for each speculative code region, but rather outer code regions may have longer timeouts.

As a result, timer expiration aborts for speculative code regions potentially guarantee forward progress in situations that otherwise may never complete. For example, previously it was possible (given specific circumstances) that a transaction (or critical section) would spin on a lock variable infinitely. To illustrate, assume a counter is implemented as a lock variable, which is to indicate if any work has been done or if a rendezvous has occurred in regards to a work queue. But in HLE a lock variable is read as unlocked (i.e. global threads see the variable as unlocked) and then increment the lock internally (i.e. other threads don't see the lock as acquired to enable concurrent execution within the work queue). Yet, an HLE section may be waiting for the lock to be set to a number of threads testing it, so the critical section never completes (i.e. it's still waiting on the counter to be incremented globally). Yet, with the implementation of timers, the critical section only waits for the timeout period and then aborts, which may cause a re-execution with traditional locks; this ensure forward progress for the critical section/thread, instead of the thread spinning infinitely on the counter/lock.

Consequently, any number of abort events (e.g. explicit abort instructions, data conflicts, timer expirations, etc.) may be tracked; potentially at the direction of hardware, firmware, software, or a combination thereof. And furthermore, any of these entities may separately or together make a determination of whether an abort of a speculative code region is to be performed based on the tracked abort events, enabling robust, flexible, and intelligent abort control mechanisms. Additionally, speculative code regions may include any combination of speculative and non-speculative instructions, which allows a programmer the upmost flexibility in utilizing TM and/or HLE. Moreover, hardware may provide software a mechanism to always abort a speculative code region to support testing/debugging of an abort fallback path.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a plurality of cores, one or more of the plurality of cores to concurrently execute multiple threads;
   one or more of the plurality of cores to perform out-of-order execution of instructions of the multiple threads; and
   one or more of the plurality of cores comprising:
      instruction fetch circuitry to fetch the instructions of one or more of the multiple threads,
      instruction decode circuitry to decode the instructions,
      register renaming circuitry to rename one or more registers within a register file,
      a data cache to cache data,
      a translation lookaside buffer to store virtual to physical address translations,
      a second level cache unit to cache instructions and data,
      transaction processing circuitry to process a transactional region of instructions including load instructions and store instructions, the transaction processing circuitry to process a transaction end instruction to indicate an end of a transaction execution region and to cause memory transactions to be atomically committed or aborted, wherein the transactional region of instructions is validated and the transactional region of instructions is committed or aborted based on the validation in response to the transaction end instruction, wherein the transaction end instruction is globally ordered and atomic,
      transaction checkpoint circuitry to store an architectural state responsive to initiation of the transactional region of instructions,
      transaction status circuitry including a programmable failure indication associated with one or more transactions, a first transaction to fail or proceed based on its associated failure indication, the transaction status circuitry including an abort events register to define a plurality of abort events to be tracked, the abort events register including a bit map of bit positions that each represent a different abort condition, the bit map including an always abort bit that causes all speculative code regions to abort when set, the transaction status circuitry including an enable/disable register to enable/disable tracking of abort events, wherein different levels of access to the enable/disable register are provided based on privilege level, wherein a first privilege level can control a first entry in the enable/disable register and a second privilege level can control a second entry in the enable disable register, wherein when at least one abort event is detected it is sent to a microcode handler in a firmware layer to determine whether to abort the speculative code regions,
      circuitry to roll back operations performed by the first transaction using the architectural state stored by the transaction checkpoint circuitry responsive to a failure of the first transaction, and
      lock elision circuitry to cause critical sections of instructions to execute as transactions on multiple threads without acquiring a lock, the lock elision circuitry to cause one or more of the critical sections to be re-executed non-speculatively using one or more locks in response to detecting a transaction failure, the lock elision circuitry including a lock elision buffer including a memory address and a lock value to be stored thereto and used to perform a late lock acquire or subsequent execution.

2. The processor of claim 1 further comprising:
commit circuitry to make results generated by the transactional region of instructions globally visible to one or more of the multiple threads including one or more other transactional regions of instructions.

3. The processor of claim 2 wherein the commit circuitry is to make the results globally visible only when no failure indication is detected.

4. The processor of claim 3 wherein the transaction status circuitry comprises a failure register to store the failure indication.

5. A processor comprising:
means for executing multiple threads on a plurality of cores;
out-of-order instruction execution means of at least one of the plurality of cores to perform out-of-order execution of instructions of the multiple threads;
one or more of the plurality of cores comprising:
  instruction fetch means to fetch the instructions of one or more of the multiple threads,
  instruction decode means to decode the instructions,
  register renaming means to rename one or more registers within a register file,
  data cache means to cache data,
  translation lookaside buffer means to store virtual to physical address translations,
  second level cache means to cache instructions and data, and
  transaction processing means to process a transactional region of instructions including load instructions and store instructions, the transaction processing means to process a transaction end instruction to indicate an end of a transaction execution region and to cause memory transactions to be atomically committed or aborted, wherein the transactional region of instructions is validated and the transactional region of instructions is committed or aborted based on the validation in response to the transaction end instruction, wherein the transaction end instruction is globally ordered and atomic;
  transaction checkpoint means to store an architectural state responsive to initiation of the transactional region of instructions;
  transaction status means including a programmable failure indication associated with one or more transactions, a first transaction to fail or proceed based on its associated failure indication, the transaction status means including an abort events register to define a plurality of abort events to be tracked, the abort events register including a bit map of bit positions that each represent a different abort condition, the bit map including an always abort bit that causes all speculative code regions to abort when set, the transaction status means including an enable/disable register to enable/disable tracking of abort events, wherein different levels of access to the enable/disable register are provided based on privilege level, wherein a first privilege level can control a first entry in the enable/disable register and a second privilege level can control a second entry in the enable disable register, wherein when at least one abort event is detected it is sent to a microcode handler in a firmware layer to determine whether to abort the speculative code regions;
  circuitry to roll back operations performed by the first transaction using the architectural state stored by the transaction checkpoint means responsive to a failure of the first transaction;
  lock elision means to cause critical sections of instructions to execute as transactions on multiple threads without acquiring a lock, the lock elision means to cause one or more of the critical sections to be re-executed non-speculatively using one or more locks in response to detecting a transaction failure, the lock elision means including a lock elision buffer including a memory address and a lock value to be stored thereto and used to perform a late lock acquire or subsequent execution.

6. The processor of claim 5 further comprising:
commit means to make results generated by the transactional region of instructions globally visible to one or more of the multiple threads including one or more other transactional regions of instructions.

7. The processor of claim 6 wherein the commit means is to make the results globally visible only when no failure indication is detected.

8. The processor of claim 7 wherein the transaction status means comprises a failure register to store the failure indication.

9. A method comprising:
performing out-of-order execution of instructions for multiple threads on a plurality of cores;
fetching instructions of one or more of the multiple threads,
decoding the instructions,
renaming one or more registers within a register file,
caching data within a data cache,
storing virtual to physical address translations within a translation lookaside buffer,
caching instructions and data within a second level cache, and
  processing a transactional region of instructions including load instructions and store instructions, processing a transaction end instruction to indicate an end of a transaction execution region and to cause memory transactions to be atomically committed or aborted, wherein the transactional region of instructions is validated and the transactional region of instructions is committed or aborted based on the validation in response to the transaction end instruction, wherein the transaction end instruction is globally ordered and atomic;
checkpointing an architectural state responsive to initiation of the transactional region of instructions;
programming a failure indication associated with one or more transactions, a first transaction to fail or proceed based on its associated failure indication, wherein a plurality of abort events to be tracked are defined in an abort events register, the abort events register including a bit map of bit positions that each represent a different abort condition, the bit map including an always abort bit that causes all speculative code regions to abort when set, the transaction status means including an enable/disable register to enable/disable tracking of abort events, wherein different levels of access to the enable/disable register are provided based on privilege level, wherein a first privilege level can control a first entry in the enable/ disable register and a second privilege level can control a second entry in the enable disable register, wherein when at least one abort event is detected it is sent to a microcode handler in a firmware layer to determine whether to abort the speculative code regions;

rolling back operations performed by the first transaction using the checkpointed architectural state responsive to a failure of the first transaction;

causing critical sections of instructions to execute as transactions on multiple threads without acquiring a lock;

causing one or more of the critical sections to be re-executed non-speculatively using one or more locks in response to detecting a transaction failure; and performing a late lock acquire within a critical section using a memory address and a lock value to be stored thereto in a lock elision buffer.

10. The method of claim 9 further comprising:
making results generated by the transactional region of instructions globally visible to one or more of the multiple threads including one or more other transactional regions of instructions.

11. The method of claim 10 wherein the results are made globally visible only when no failure indication is detected.

12. The method of claim 11 wherein the failure indication is stored in a failure register.

13. A system comprising:
a plurality of cores, one or more of the plurality of cores to concurrently execute multiple threads; and
one or more of the plurality of cores to perform out-of-order execution of instructions of the multiple threads; and
one or more of the plurality of cores comprising two or more hardware threads to simultaneously execute two or more of the multiple threads, the two or more of the hardware threads comprising:
  instruction fetch logic to fetch the instructions of the two or more of the multiple threads,
  instruction decode logic to decode the instructions of the two or more of the multiple threads,
  register renaming logic to rename one or more registers within a register file,
  a data cache to cache data to be processed by the two or more of the multiple threads,
  a second level cache unit to cache instructions and data of the two or more of the multiple threads, and
  transaction processing circuitry to process a transactional region of instructions of the two or more of the multiple threads including load instructions and store instructions, the transaction processing circuitry to process a transaction abort instruction to abort processing of the transactional region responsive to an abort condition or a transaction end instruction to indicate an end of a transaction execution region and to cause memory transactions to be atomically committed or aborted, wherein the transactional region of instructions is validated and the transactional region of instructions is committed or aborted based on the validation in response to the transaction end instruction, wherein the transaction end instruction is globally ordered and atomic;
  transaction checkpoint circuitry to store an architectural state of the two or more of the multiple threads responsive to initiation of the transactional region of instructions;
  transaction status circuitry including a programmable failure indication associated with one or more transactions, a first transaction to fail or proceed based on its associated failure indication, the transaction status circuitry including an abort events register to define a plurality of abort events to be tracked, the abort events register including a bit map of bit positions that each represent a different abort condition, the bit map including an always abort bit that causes all speculative code regions to abort when set, the transaction status circuitry including an enable/disable register to enable/disable tracking of abort events, wherein different levels of access to the enable/disable register are provided based on privilege level, wherein a first privilege level can control a first entry in the enable/disable register and a second privilege level can control a second entry in the enable disable register, wherein when at least one abort event is detected it is sent to a microcode handler in a firmware layer to determine whether to abort the speculative code regions;
  circuitry to roll back operations performed by the first transaction using the architectural state stored by the transaction checkpoint circuitry responsive to a failure of the first transaction;
  lock elision circuitry to cause critical sections of instructions to execute as transactions on multiple threads without acquiring a lock, the lock elision circuitry to cause one or more of the critical sections to be re-executed non-speculatively using one or more locks in response to detecting a transaction failure, the lock elision circuitry including a lock elision buffer including a memory address and a lock value to be stored thereto and used to perform a late lock acquire or subsequent execution; and
  an execution circuit to execute a software failure handler in response to a software-induced abort condition; and
one or more integrated memory controllers to communicatively couple the plurality of cores to dynamic random access system memory, the integrated memory controllers including a circuit to implement a page table structure to divide a physical memory into a plurality of virtual pages.

14. The system as in claim 13 further comprising:
a peripheral component interface express (PCIe) interface to communicatively couple the cores to one or more devices.

15. The system as in claim 13 further comprising:
a shared cache to be shared by two or more of the plurality of cores.

16. The system as in claim 15 further comprising:
a cache coherent interconnect to communicatively couple the shared cache to an accelerator device.

17. The system as in claim 13 further comprising:
a peripheral component interface express (PCIe) interface to communicatively couple the cores to one or more devices;
a shared cache to be shared by two or more of the plurality of cores; and
a bus interface to communicatively couple the shared cache to an accelerator device.

18. A system comprising:
a plurality of processors;
a processor interconnect to communicatively couple two of the plurality of processors;

a system memory comprising dynamic random access memory communicatively coupled to a processor of the plurality of processors over a memory interconnect; and one or more of the plurality of processors comprising: a plurality of cores, one or more of the plurality of cores to concurrently execute multiple threads;

one or more of the plurality of cores to perform out-of-order execution of instructions of the multiple threads;

one or more of the plurality of cores comprising two or more hardware threads to simultaneously execute two or more of the multiple threads, the two or more of the hardware threads comprising:

instruction fetch logic to fetch the instructions of the two or more of the multiple threads, instruction decode logic to decode the instructions of the two or more of the multiple threads, register renaming logic to rename one or more registers within a register file, a data cache to cache data to be processed by the two or more of the multiple threads, a translation lookaside buffer to store virtual to physical address translations usable by the two or more of the multiple threads, a second level cache unit to cache instructions and data of the two or more of the multiple threads, and transaction processing circuitry to process a transactional region of instructions of the two or more of the multiple threads including load instructions and store instructions, the transaction processing circuitry to process a transaction abort instruction to abort processing of the transactional region responsive to an abort condition or a transaction end instruction to indicate an end of the transaction execution region and to cause memory transactions to be atomically committed or aborted, wherein the transactional region of instructions is validated and the transactional region of instructions is committed or aborted based on the validation in response to the transaction end instruction, wherein the transaction end instruction is globally ordered and atomic;

transaction checkpoint circuitry to store an architectural state of the two or more of the multiple threads responsive to initiation of the transactional region of instructions;

transaction status circuitry including a programmable failure indication associated with one or more transactions, a first transaction to fail or proceed based on its associated failure indication, the transaction status circuitry including an abort events register to define a plurality of abort events to be tracked, the abort events register including a bit map of bit positions that each represent a different abort condition, the bit map including an always abort bit that causes all speculative code regions to abort when set, the transaction status circuitry including an enable/disable register to enable/disable tracking of abort events, wherein different levels of access to the enable/disable register are provided based on privilege level, wherein a first privilege level can control a first entry in the enable/disable register and a second privilege level can control a second entry in the enable disable register, wherein when at least one abort event is detected it is sent to a microcode handler in a firmware layer to determine whether to abort the speculative code regions;

circuitry to roll back operations performed by the first transaction using the architectural state stored by the transaction checkpoint circuitry responsive to a failure of the first transaction;

lock elision circuitry to cause critical sections of instructions to execute as transactions on multiple threads without acquiring a lock, the lock elision circuitry to cause one or more of the critical sections to be re-executed non-speculatively using one or more locks in response to detecting a transaction failure, the lock elision circuitry including a lock elision buffer including a memory address and a lock value to be stored thereto and used to perform a late lock acquire or subsequent execution; and an execution circuit to execute a software failure handler in response to a software-induced abort condition.

19. The system of claim 18, further comprising at least one network device communicatively coupled to at least one of the plurality of processors.

20. The system of claim 18, further comprising a storage device communicatively coupled to at least one of the plurality of processors.

* * * * *